US011950294B2

(12) United States Patent
Lei et al.

(10) Patent No.: US 11,950,294 B2
(45) Date of Patent: *Apr. 2, 2024

(54) REFERENCE SIGNAL TRANSMISSION TECHNIQUES FOR RANDOM ACCESS MESSAGES

(71) Applicant: QUALCOMM Incorporated, San Diego, CA (US)

(72) Inventors: Jing Lei, San Diego, CA (US); Wanshi Chen, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/478,662

(22) Filed: Sep. 17, 2021

(65) Prior Publication Data

US 2022/0007428 A1 Jan. 6, 2022

Related U.S. Application Data

(60) Continuation of application No. 17/196,854, filed on Mar. 9, 2021, now Pat. No. 11,792,857, which is a
(Continued)

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0051* (2013.01); *H04L 5/0094* (2013.01);
(Continued)

(58) Field of Classification Search
CPC . H04L 5/0051; H04L 5/0094; H04L 27/2607; H04W 72/0446; H04W 74/0833; H04W 76/27
See application file for complete search history.

(56) References Cited

U.S. PATENT DOCUMENTS 10,980,067 B2   4/2021   Lei et al.
11,503,634 B2   11/2022  Lee et al.
(Continued)

FOREIGN PATENT DOCUMENTS

CN       108631998 A      10/2018
WO    WO-2014110924 A1    7/2014

OTHER PUBLICATIONS

Ericsson: "Procedure for Two-step RACH", 3GPP Draft, R1-1909123, Procedure for Two-step RACH, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051765726, 16 pages, Retrieved from the Internet: URL: http://www.3gpp.org/ftp/tsg_ran/WG1_RL1/TSGR1_98/Docs/R1-1909123.zip. [retrieved on Aug. 17, 2019] Sect. 6.3.
(Continued)

*Primary Examiner* — Melanie Jagannathan
(74) *Attorney, Agent, or Firm* — Holland & Hart LLP/Qualcomm

(57) ABSTRACT

Methods, systems, and devices for wireless communications are described for a two-step random access channel (RACH) procedure in which uplink random access preamble and message transmission occasions may span multiple transmission slots. Reference signal resources for transmitting a reference signal with a first random access message of the two-step RACH procedure may include at least one symbol in each of the multiple transmission slots. The reference signal resources, reference signal sequence, or both, may be identified based on a particular uplink random access message transmission occasion, random access preamble transmission occasion, random access preamble sequence configuration, or any combinations thereof.

30 Claims, 21 Drawing Sheets

Related U.S. Application Data division of application No. 16/790,711, filed on Feb. 13, 2020, now Pat. No. 10,980,067.

(60) Provisional application No. 62/842,133, filed on May 2, 2019.

(51) Int. Cl.
*H04L 27/26* (2006.01)
*H04W 72/0446* (2023.01)
*H04W 74/0833* (2024.01)
*H04W 76/27* (2018.01)

(52) U.S. Cl.
CPC ..... *H04L 27/2607* (2013.01); *H04W 72/0446* (2013.01); *H04W 76/27* (2018.02)

(56) References Cited

U.S. PATENT DOCUMENTS

| | | | |
|---|---|---|---|
| 2009/0292752 A1 | 11/2009 | Schneider | |
| 2016/0037550 A1 | 2/2016 | Barabell et al. | |
| 2016/0227441 A1 | 8/2016 | Park et al. | |
| 2017/0230156 A1 | 8/2017 | Fakoorian et al. | |
| 2018/0070380 A1 | 3/2018 | Nagaraja et al. | |
| 2018/0242367 A1 | 8/2018 | Kim et al. | |
| 2019/0020388 A1 | 1/2019 | Lee et al. | |
| 2019/0261407 A1 | 8/2019 | Irukulapati et al. | |
| 2019/0313383 A1* | 10/2019 | Xiong | H04W 16/14 |
| 2020/0008240 A1 | 1/2020 | Golitschek et al. | |
| 2020/0107369 A1 | 4/2020 | Jeon et al. | |
| 2020/0154295 A1* | 5/2020 | Lin | H04W 52/0216 |
| 2020/0187264 A1 | 6/2020 | Charbit et al. | |
| 2020/0213901 A1 | 7/2020 | Yoshimoto et al. | |
| 2020/0229104 A1 | 7/2020 | Molavianjazi et al. | |
| 2020/0229242 A1* | 7/2020 | Xiong | H04W 74/0833 |
| 2020/0245373 A1 | 7/2020 | Xiong et al. | |
| 2020/0260500 A1 | 8/2020 | Agiwal et al. | |
| 2020/0266947 A1 | 8/2020 | Noh et al. | |
| 2020/0267659 A1 | 8/2020 | Molavianjazi et al. | |
| 2020/0267772 A1 | 8/2020 | Jung et al. | |
| 2020/0267774 A1 | 8/2020 | Vos et al. | |
| 2021/0160117 A1 | 5/2021 | Xiong et al. | |
| 2021/0195656 A1 | 6/2021 | Lei et al. | |
| 2021/0243777 A1 | 8/2021 | Tsai et al. | |
| 2021/0410182 A1 | 12/2021 | Zhang et al. | |
| 2022/0053567 A1 | 2/2022 | Lei et al. | |
| 2022/0053576 A1 | 2/2022 | Lu | |
| 2022/0078840 A1* | 3/2022 | Park | H04W 74/004 |
| 2022/0116169 A1* | 4/2022 | Stare | H04L 5/0048 |
| 2022/0124816 A1 | 4/2022 | Farag et al. | |
| 2022/0132583 A1 | 4/2022 | Ko et al. | |
| 2022/0141883 A1 | 5/2022 | Lee et al. | |
| 2022/0150018 A1 | 5/2022 | Ko et al. | |
| 2022/0150956 A1 | 5/2022 | Xiong et al. | |
| 2022/0159745 A1 | 5/2022 | Farag et al. | |
| 2022/0173856 A1 | 6/2022 | Ko et al. | |
| 2022/0191935 A1 | 6/2022 | Xiong et al. | |
| 2022/0210841 A1 | 6/2022 | Lin et al. | |
| 2022/0272748 A1 | 8/2022 | Xiong et al. | |
| 2022/0394782 A1* | 12/2022 | Ye | H04W 72/0446 |
| 2023/0127817 A1* | 4/2023 | Lee | H04W 64/00 370/329 |
| 2023/0389086 A1 | 11/2023 | Lei et al. | |

OTHER PUBLICATIONS

International Search Report and Written Opinion—PCT/US2020/018379—ISA/EPO—dated Aug. 3, 2020.

Nokia., et al., "2-step RACH Procedure Feature Lead Summary-Update 3", 3GPP Draft, R1-1905874, 2-step RACH Procedure Feature Lead Summary RAN1#96B#3, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 15, 2019 (Apr. 15, 2019), XP051707918, 96 pages, Retrieved from the Internet: URL: http://www.3gpp.org/ftp/tsg%5Fran/WG1%5FRL1/TSGR1%5F96b/Docs/R1%2D1905874%2Ezip. [retrieved on Apr. 15, 2019] Sect. s 7-9.

Partial International Search Report—PCT/US2020/018379—ISA/EPO—dated Jun. 12, 2020.

Vivo: "Discussion on Channel Structure for 2-step RACH," 3GPP TSG RAN WG1 #97, R1-1906124, May 1, 2019 (May 1, 2019), 14 pages, Retrieved from the Internet: URL: http://www.3gpp.org/ftp/tsg%5Fran/WG1%5FRL1/TSGR1%5F97/Docs/R1%2D1906124%2Ezip. [retrieved on May 1, 2019] Sect. 2.3, the whole document.

ZTE: "FL Summary #2 of Channel Structure for Two-step RACH", 3GPP Draft, R1-1909860, FL Summary #2 of Channel Structure for Two-step RACH (7.2.1.1), 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Sep. 3, 2019 (Sep. 3, 2019), XP051766452, 38 pages, Retrieved from the Internet: URL: http://www.3gpp.org/ftp/tsg_ran/WG1_RL1/TSGR1_98/Docs/R1-1909860.zip. [retrieved on Sep. 3, 2019] Sect. 2.1.1, sections 2.1.4, 2.2.1, pp. 25, 26.

ZTE: "Updated Summary of 7.2.1.1 Channel Structure for Two-step RACH", 3GPP Draft, 3GPP TSG RAN WG1 #96bis, R1-1905793, Updated Summary of 7.2.1.1 Channel Structure for Two-step RACH, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 15, 2019 (Apr. 15, 2019), XP051707841, 36 pages, Retrieved from the Internet: URL: http://www.3gpp.org/ftp/tsg%5Fran/WG1%5FRL1/TSGR1%5F96b/Docs/R1%2D1905793%2Ezip. [retrieved on Apr. 15, 2019] Sect. s 2.1. 2.2.

Qualcomm Incorporated: "Channel Structure for Two-Step Rach", 3GPP TSG-RAN WG1 Meeting #96Bis, R1-1904992, Channel Structurefor Two-Step Rach, 3rd Generationpartnership Project (3GPP), Mobile Competence Centre; 650, Route Deslucioles; F-06921 Sophia-Antipolis Cedex; France, vol. RAN WG1, No. Xi'an, China; Apr. 8, 2019-Apr. 12, 2019, Apr. 7, 2019 (Apr. 7, 2019), pp. 1-11, XP051700107, Sections 2.

* cited by examiner

REFERENCE SIGNAL TRANSMISSION TECHNIQUES FOR RANDOM ACCESS MESSAGES

CROSS REFERENCE

The present Application for Patent is a Continuation of U.S. patent application Ser. No. 17/196,854 by LEI et al., entitled "REFERENCE SIGNAL TRANSMISSION TECHNIQUES FOR RANDOM ACCESS MESSAGES" filed Mar. 9, 2021, which is a Divisional of U.S. patent application Ser. No. 16/790,711 by LEI et al., entitled "REFERENCE SIGNAL TRANSMISSION TECHNIQUES FOR RANDOM ACCESS MESSAGES" filed Feb. 13, 2020, which claims the benefit of U.S. Provisional Patent Application No. 62/842,133 by LEI et al., entitled "REFERENCE SIGNAL TRANSMISSION TECHNIQUES FOR RANDOM ACCESS MESSAGES," filed May 2, 2019, assigned to the assignee hereof, and expressly incorporated herein.

BACKGROUND

The following relates generally to wireless communications, and more specifically to reference signal transmission techniques for random access messages.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). When connecting to a base station to receive and/or transmit communications, a UE may perform a random access channel (RACH) procedure to establish the connection with the base station. Efficient techniques for determining configuration information for one or more messages of the RACH procedure may help to enhance the efficiency of a wireless communications system.

SUMMARY

The described techniques relate to improved methods, systems, devices, and apparatuses that support reference signal transmission techniques for random access messages. Various techniques described herein provide for a two-step random access channel (RACH) procedure in which RACH resources may span multiple transmission slots. In some cases, reference signal resources for transmitting a reference signal with the first random access message of the two-step RACH procedure may include at least one symbol in each of the multiple transmission slots. In some cases, the reference signal resources within each of the multiple transmission slots may be identified based at least in part on a particular uplink shared channel (e.g., a physical uplink shared channel (PUSCH)) transmission occasion (e.g., a PUSCH occasion (PO)) that is used to transmit the first random access message. In some cases, a base station may provide system information that indicates two or more available random access occasions and two or more available uplink shared channel transmission occasions within each of the two or more available random access occasions. In such cases, a UE may select a random access occasion and an uplink shared channel transmission occasion and determine a reference signal sequence for a reference signal to be transmitted with the first random access message based on identifiers associated with the selected random access occasion and an uplink shared channel transmission occasion.

A method of wireless communication at a UE is described. The method may include receiving system information from a base station, the system information including an indication of two or more available uplink shared channel transmission occasions for a random access message transmission from the UE, selecting a first uplink shared channel transmission occasion of the two or more available uplink shared channel transmission occasions for transmission of a first random access message, where the first uplink shared channel transmission occasion spans at least two transmission slots, determining, based on the system information, reference signal resources within the first uplink shared channel transmission occasion for transmitting a reference signal with the first random access message, where the reference signal resources include at least one symbol in each of the two or more transmission slots, formatting the first random access message based on the selected first uplink shared channel transmission occasion and the determined reference signal resources, the first random access message including the reference signal and uplink shared channel data, and transmitting the first random access message to the base station.

An apparatus for wireless communication at a UE is described. The apparatus may include a processor, memory in electronic communication with the processor, and instructions stored in the memory. The instructions may be executable by the processor to cause the apparatus to receive system information from a base station, the system information including an indication of two or more available uplink shared channel transmission occasions for a random access message transmission from the UE, select a first uplink shared channel transmission occasion of the two or more available uplink shared channel transmission occasions for transmission of a first random access message, where the first uplink shared channel transmission occasion spans at least two transmission slots, determine, based on the system information, reference signal resources within the first uplink shared channel transmission occasion for transmitting a reference signal with the first random access message, where the reference signal resources include at least one symbol in each of the two or more transmission slots, format the first random access message based on the selected first uplink shared channel transmission occasion and the determined reference signal resources, the first random access message including the reference signal and uplink shared channel data, and transmit the first random access message to the base station.

Another apparatus for wireless communication at a UE is described. The apparatus may include means for receiving system information from a base station, the system information including an indication of two or more available uplink shared channel transmission occasions for a random access message transmission from the UE, selecting a first uplink shared channel transmission occasion of the two or more available uplink shared channel transmission occasions for transmission of a first random access message, where the first uplink shared channel transmission occasion spans at least two transmission slots, determining, based on the system information, reference signal resources within the first uplink shared channel transmission occasion for transmitting a reference signal with the first random access message, where the reference signal resources include at least one symbol in each of the two or more transmission slots, formatting the first random access message based on the selected first uplink shared channel transmission occasion and the determined reference signal resources, the first random access message including the reference signal and uplink shared channel data, and transmitting the first random access message to the base station.

A non-transitory computer-readable medium storing code for wireless communication at a UE is described. The code may include instructions executable by a processor to receive system information from a base station, the system information including an indication of two or more available uplink shared channel transmission occasions for a random access message transmission from the UE, select a first uplink shared channel transmission occasion of the two or more available uplink shared channel transmission occasions for transmission of a first random access message, where the first uplink shared channel transmission occasion spans at least two transmission slots, determine, based on the system information, reference signal resources within the first uplink shared channel transmission occasion for transmitting a reference signal with the first random access message, where the reference signal resources include at least one symbol in each of the two or more transmission slots, format the first random access message based on the selected first uplink shared channel transmission occasion and the determined reference signal resources, the first random access message including the reference signal and uplink shared channel data, and transmit the first random access message to the base station.

Some examples of the method, apparatuses, and non-transitory computer-readable medium described herein may further include operations, features, means, or instructions for determining a random access preamble for transmission with the first random access message, and determining a reference signal sequence for the reference signal based on the random access preamble. In some examples of the method, apparatuses, and non-transitory computer-readable medium described herein, the reference signal may be a demodulation reference signal, and where the reference signal resources in each of the two or more transmission slots may be front-loaded in each of the at least two transmission slots, may be distributed in each of the at least two transmission slots, or combinations thereof.

In some examples of the method, apparatuses, and non-transitory computer-readable medium described herein, the formatting further may include operations, features, means, or instructions for applying a cover code to the reference signal that may be associated with the UE. In some examples of the method, apparatuses, and non-transitory computer-readable medium described herein, the cover code may be a binary orthogonal cover code, a non-binary orthogonal cover code, or a quasi-orthogonal cover code. In some examples of the method, apparatuses, and non-transitory computer-readable medium described herein, the formatting further may include operations, features, means, or instructions for determining the cover code based on a codebook indicated by the system information, and where the cover code spans all of the reference signal resources in each of the two or more transmission slots. In some examples of the method, apparatuses, and non-transitory computer-readable medium described herein, the formatting further may include operations, features, means, or instructions for determining separate cover codes associated with each of the two or more transmission slots based on different codebooks associated with each of the two or more transmission slots. In some examples of the method, apparatuses, and non-transitory computer-readable medium described herein, the different codebooks may be each associated with different subsets of the two or more available uplink shared channel transmission occasions. In some examples of the method, apparatuses, and non-transitory computer-readable medium described herein, the cover code may be applied separately or jointly across frequency domain resources associated with the two or more available uplink shared channel transmission occasions.

In some examples of the method, apparatuses, and non-transitory computer-readable medium described herein, the UE is in a radio resource control (RRC) connected state and the system information is received via RRC signaling.

A method of wireless communication at a UE is described. The method may include receiving system information from a base station, the system information including an indication of two or more available random access occasions and two or more available uplink shared channel transmission occasions within each of the two or more available random access occasions, where each of the two or more available random access occasions is indicated by an associated random access occasion identifier and each of the two or more available uplink shared channel transmission occasions is indicated by an associated uplink shared channel transmission occasion identifier, selecting a first random access occasion of the two or more available random access occasions and a first uplink shared channel transmission occasion of the two or more available uplink shared channel transmission occasions for transmission of a first random access message, determining, based on a first random access occasion identifier associated with the first random access occasion, a first uplink shared channel transmission occasion identifier associated with the first uplink shared channel transmission occasion, or combinations thereof, a reference signal sequence for a reference signal to be transmitted with the first random access message, and transmitting the first random access message to the base station.

An apparatus for wireless communication at a UE is described. The apparatus may include a processor, memory in electronic communication with the processor, and instructions stored in the memory. The instructions may be executable by the processor to cause the apparatus to receive system information from a base station, the system information including an indication of two or more available random access occasions and two or more available uplink shared channel transmission occasions within each of the two or more available random access occasions, where each of the two or more available random access occasions is indicated by an associated random access occasion identifier and each of the two or more available uplink shared channel transmission occasions is indicated by an associated uplink shared channel transmission occasion identifier, select a first random access occasion of the two or more available random access occasions and a first uplink shared channel transmission occasion of the two or more available uplink shared channel transmission occasions for transmission of a first random access message, determine, based on a first random access occasion identifier associated with the first random access occasion, a first uplink shared channel transmission occasion identifier associated with the first uplink shared channel transmission occasion, or combinations thereof, a reference signal sequence for a reference signal to be transmitted with the first random access message, and transmit the first random access message to the base station.

Another apparatus for wireless communication at a UE is described. The apparatus may include means for receiving system information from a base station, the system information including an indication of two or more available random access occasions and two or more available uplink shared channel transmission occasions within each of the two or more available random access occasions, where each of the two or more available random access occasions is indicated by an associated random access occasion identifier and each of the two or more available uplink shared channel transmission occasions is indicated by an associated uplink shared channel transmission occasion identifier, selecting a first random access occasion of the two or more available random access occasions and a first uplink shared channel transmission occasion of the two or more available uplink shared channel transmission occasions for transmission of a first random access message, determining, based on a first random access occasion identifier associated with the first random access occasion, a first uplink shared channel transmission occasion identifier associated with the first uplink shared channel transmission occasion, or combinations thereof, a reference signal sequence for a reference signal to be transmitted with the first random access message, and transmitting the first random access message to the base station.

A non-transitory computer-readable medium storing code for wireless communication at a UE is described. The code may include instructions executable by a processor to receive system information from a base station, the system information including an indication of two or more available random access occasions and two or more available uplink shared channel transmission occasions within each of the two or more available random access occasions, where each of the two or more available random access occasions is indicated by an associated random access occasion identifier and each of the two or more available uplink shared channel transmission occasions is indicated by an associated uplink shared channel transmission occasion identifier, select a first random access occasion of the two or more available random access occasions and a first uplink shared channel transmission occasion of the two or more available uplink shared channel transmission occasions for transmission of a first random access message, determine, based on a first random access occasion identifier associated with the first random access occasion, a first uplink shared channel transmission occasion identifier associated with the first uplink shared channel transmission occasion, or combinations thereof, a reference signal sequence for a reference signal to be transmitted with the first random access message, and transmit the first random access message to the base station.

In some examples of the method, apparatuses, and non-transitory computer-readable medium described herein, the determining the reference signal sequence further may include operations, features, means, or instructions for determining an initialization seed for a polynomial generator that generates the reference signal sequence, the initialization seed based on one or more of the first uplink shared channel transmission occasion identifier, the first random access occasion identifier, a preamble sequence identifier provided in the system information, or any combinations thereof.

In some examples of the method, apparatuses, and non-transitory computer-readable medium described herein, the initialization seed may be further based on one or more of a symbol index of a symbol within a transmission slot that carries the reference signal, a transmission slot number of the transmission slot within a radio frame, a sub-carrier spacing used for transmitting the first random access message, one or more scaling constants, or any combinations thereof. In some examples of the method, apparatuses, and non-transitory computer-readable medium described herein, the polynomial generator may be a closed-form polynomial generator that generates a pseudo-random noise (PN) sequence.

In some examples of the method, apparatuses, and non-transitory computer-readable medium described herein, the reference signal sequence may be a preconfigured gold sequence that may be selected from a set of available preconfigured gold sequences based on the first random access occasion identifier and the first uplink shared channel transmission occasion identifier.

In some examples of the method, apparatuses, and non-transitory computer-readable medium described herein, the reference signal sequence includes a cyclic prefix orthogonal frequency division multiplexing (CP-OFDM) waveform demodulation reference signal (DMRS) sequence. In some examples of the method, apparatuses, and non-transitory computer-readable medium described herein, the determining the reference signal sequence further may include operations, features, means, or instructions for determining a base sequence based on one or more of a group index, a sequence index, a cyclic shift, or any combinations thereof, indicated in the system information. In some examples of the method, apparatuses, and non-transitory computer-readable medium described herein, the group index may be determined based on one or more of the first uplink shared channel transmission occasion identifier, the first random access occasion identifier, a preamble sequence identifier provided in the system information, or any combinations thereof. In some examples of the method, apparatuses, and non-transitory computer-readable medium described herein, the group index may be further determined based on a group hopping index provided in the system information, a reference signal sequence hopping index provided in the system information, or any combinations thereof.

In some examples of the method, apparatuses, and non-transitory computer-readable medium described herein, the base sequence may be selected from a set of available base sequences including Zadoff-Chu sequences, computer generated sequences, modified chirp sequences, composite sequences with low peak to average power ratios, or any combinations thereof. In some examples of the method, apparatuses, and non-transitory computer-readable medium described herein, the reference signal sequence includes a discrete Fourier transform spread orthogonal frequency division multiplexing (DFT-s-OFDM) waveform demodulation reference signal (DMRS) sequence.

In some examples of the method, apparatuses, and non-transitory computer-readable medium described herein, the two or more available random access occasions and two or more available uplink shared channel transmission occasions are associated with an RRC state. In some examples of the method, apparatuses, and non-transitory computer-readable medium described herein, the first random access occasion and the first uplink shared channel transmission occasion may be selected based at least in part on the UE being in the RRC state.

A method of wireless communication at a base station is described. The method may include determining two or more uplink shared channel transmission occasions for a random access message transmission from at least a first UE of a set of UEs served by the base station, where at least a first uplink shared channel transmission occasion of the two or more uplink shared channel transmission occasions spans two or more transmission slots, configuring reference signal resources for each of the two or more uplink shared channel transmission occasions, where the reference signal resources for the first uplink shared channel transmission occasion include at least one symbol in each of the two or more transmission slots, transmitting system information to the set of UEs that indicates the two or more uplink shared channel transmission occasions, and the configured reference signal resources, that are available for random access message transmissions of the set of UEs, and receiving a first random access message from the first UE based on a reference signal transmitted in the reference signal resources associated with the uplink shared channel transmission occasion selected by the first UE for transmission of the first random access message.

An apparatus for wireless communication at a base station is described. The apparatus may include a processor, memory in electronic communication with the processor, and instructions stored in the memory. The instructions may be executable by the processor to cause the apparatus to determine two or more uplink shared channel transmission occasions for a random access message transmission from at least a first UE of a set of UEs served by the base station, where at least a first uplink shared channel transmission occasion of the two or more uplink shared channel transmission occasions spans two or more transmission slots, configure reference signal resources for each of the two or more uplink shared channel transmission occasions, where the reference signal resources for the first uplink shared channel transmission occasion include at least one symbol in each of the two or more transmission slots, transmit system information to the set of UEs that indicates the two or more uplink shared channel transmission occasions, and the configured reference signal resources, that are available for random access message transmissions of the set of UEs, and receive a first random access message from the first UE based on a reference signal transmitted in the reference signal resources associated with the uplink shared channel transmission occasion selected by the first UE for transmission of the first random access message.

Another apparatus for wireless communication at a base station is described. The apparatus may include means for determining two or more uplink shared channel transmission occasions for a random access message transmission from at least a first UE of a set of UEs served by the base station, where at least a first uplink shared channel transmission occasion of the two or more uplink shared channel transmission occasions spans two or more transmission slots, configuring reference signal resources for each of the two or more uplink shared channel transmission occasions, where the reference signal resources for the first uplink shared channel transmission occasion include at least one symbol in each of the two or more transmission slots, transmitting system information to the set of UEs that indicates the two or more uplink shared channel transmission occasions, and the configured reference signal resources, that are available for random access message transmissions of the set of UEs, and receiving a first random access message from the first UE based on a reference signal transmitted in the reference signal resources associated with the uplink shared channel transmission occasion selected by the first UE for transmission of the first random access message.

A non-transitory computer-readable medium storing code for wireless communication at a base station is described. The code may include instructions executable by a processor to determine two or more uplink shared channel transmission occasions for a random access message transmission from at least a first UE of a set of UEs served by the base station, where at least a first uplink shared channel transmission occasion of the two or more uplink shared channel transmission occasions spans two or more transmission slots, configure reference signal resources for each of the two or more uplink shared channel transmission occasions, where the reference signal resources for the first uplink shared channel transmission occasion include at least one symbol in each of the two or more transmission slots, transmit system information to the set of UEs that indicates the two or more uplink shared channel transmission occasions, and the configured reference signal resources, that are available for random access message transmissions of the set of UEs, and receive a first random access message from the first UE based on a reference signal transmitted in the reference signal resources associated with the uplink shared channel transmission occasion selected by the first UE for transmission of the first random access message.

Some examples of the method, apparatuses, and non-transitory computer-readable medium described herein may further include operations, features, means, or instructions for determining a random access preamble of the first random access message, determining a reference signal sequence of the reference signal of the first random access message based on the random access preamble of the first random access message, and demodulating and decoding a payload of the first random access message based on the random access preamble and the reference signal sequence. In some examples of the method, apparatuses, and non-transitory computer-readable medium described herein, the reference signal may be a demodulation reference signal, and where the reference signal resources in each of the two or more transmission slots may be front-loaded in each of the at least two transmission slots, may be distributed in each of the at least two transmission slots, or combinations thereof.

Some examples of the method, apparatuses, and non-transitory computer-readable medium described herein may further include operations, features, means, or instructions for decoding the first random access message based on a cover code applied to the reference signal that may be associated with the first UE. In some examples of the method, apparatuses, and non-transitory computer-readable medium described herein, the cover code may be a binary orthogonal cover code, a non-binary orthogonal cover code, or a quasi-orthogonal cover code. In some examples of the method, apparatuses, and non-transitory computer-readable medium described herein, the configuring further may include operations, features, means, or instructions for configuring an indication of two or more cover code codebooks in the system information, and where at least a first cover code of a first cover code codebook spans all of the reference signal resources in each of the two or more transmission slots of the first uplink shared channel transmission occasion. In some examples of the method, apparatuses, and non-transitory computer-readable medium described herein, the configuring further may include operations, features, means, or instructions for configuring different cover code codebooks for each of the two or more transmission slots of the first uplink shared channel transmission occasion. In some examples of the method, apparatuses, and non-transitory computer-readable medium described herein, the different cover code codebooks may be each associated with different subsets of the two or more uplink shared channel transmission occasions. In some examples of the method, apparatuses, and non-transitory computer-readable medium described herein, the cover codes may be applied separately or jointly across frequency domain resources associated with the two or more uplink shared channel transmission occasions.

In some examples of the method, apparatuses, and non-transitory computer-readable medium described herein, the two or more uplink shared channel transmission occasions are determined for an RRC state.

A method of wireless communication at a base station is described. The method may include configuring two or more random access occasions and two or more uplink shared channel transmission occasions within each of the two or more random access occasions that are available for at least a first UE to transmit a first random access message, where each of the two or more random access occasions has an associated random access occasion identifier and each of the two or more uplink shared channel transmission occasions has an associated uplink shared channel transmission occasion identifier, transmitting system information to a set of UEs, the system information including random access occasion identifiers of the configured two or more random access occasions and uplink shared channel transmission occasion identifiers of the configured two or more uplink shared channel transmission occasions, receiving the first random access message from the first UE in a first uplink shared channel transmission occasion of a first random access occasions, where the first random access message includes a reference signal, identifying, based on a first random access occasion identifier associated with the first random access occasion and a first uplink shared channel transmission occasion identifier associated with the first uplink shared channel transmission occasion, a reference signal sequence for the reference signal transmitted with the first random access message, and demodulating the first random access message based on the determined reference signal sequence.

An apparatus for wireless communication at a base station is described. The apparatus may include a processor, memory in electronic communication with the processor, and instructions stored in the memory. The instructions may be executable by the processor to cause the apparatus to configure two or more random access occasions and two or more uplink shared channel transmission occasions within each of the two or more random access occasions that are available for at least a first UE to transmit a first random access message, where each of the two or more random access occasions has an associated random access occasion identifier and each of the two or more uplink shared channel transmission occasions has an associated uplink shared channel transmission occasion identifier, transmit system information to a set of UEs, the system information including random access occasion identifiers of the configured two or more random access occasions and uplink shared channel transmission occasion identifiers of the configured two or more uplink shared channel transmission occasions, receive the first random access message from the first UE in a first uplink shared channel transmission occasion of a first random access occasions, where the first random access message includes a reference signal, identify, based on a first random access occasion identifier associated with the first random access occasion and a first uplink shared channel transmission occasion identifier associated with the first uplink shared channel transmission occasion, a reference signal sequence for the reference signal transmitted with the first random access message, and demodulate the first random access message based on the determined reference signal sequence.

Another apparatus for wireless communication at a base station is described. The apparatus may include means for configuring two or more random access occasions and two or more uplink shared channel transmission occasions within each of the two or more random access occasions that are available for at least a first UE to transmit a first random access message, where each of the two or more random access occasions has an associated random access occasion identifier and each of the two or more uplink shared channel transmission occasions has an associated uplink shared channel transmission occasion identifier, transmitting system information to a set of UEs, the system information including random access occasion identifiers of the configured two or more random access occasions and uplink shared channel transmission occasion identifiers of the configured two or more uplink shared channel transmission occasions, receiving the first random access message from the first UE in a first uplink shared channel transmission occasion of a first random access occasions, where the first random access message includes a reference signal, determining, based on a first random access occasion identifier associated with the first random access occasion and a first uplink shared channel transmission occasion identifier associated with the first uplink shared channel transmission occasion, a reference signal sequence for the reference signal transmitted with the first random access message, and demodulating the first random access message based on the determined reference signal sequence.

A non-transitory computer-readable medium storing code for wireless communication at a base station is described. The code may include instructions executable by a processor to configure two or more random access occasions and two or more uplink shared channel transmission occasions within each of the two or more random access occasions that are available for at least a first UE to transmit a first random access message, where each of the two or more random access occasions has an associated random access occasion identifier and each of the two or more uplink shared channel transmission occasions has an associated uplink shared channel transmission occasion identifier, transmit system information to a set of UEs, the system information including random access occasion identifiers of the configured two or more random access occasions and uplink shared channel transmission occasion identifiers of the configured two or more uplink shared channel transmission occasions, receive the first random access message from the first UE in a first uplink shared channel transmission occasion of a first random access occasions, where the first random access message includes a reference signal, determining, based on a first random access occasion identifier associated with the first random access occasion and a first uplink shared channel transmission occasion identifier associated with the first uplink shared channel transmission occasion, a reference signal sequence for the reference signal transmitted with the first random access message, and demodulate the first random access message based on the determined reference signal sequence.

In some examples of the method, apparatuses, and non-transitory computer-readable medium described herein, the determining the reference signal sequence further may include operations, features, means, or instructions for determining an initialization seed for a polynomial generator that generates the reference signal sequence, the initialization seed based on one or more of the first uplink shared channel transmission occasion identifier, the first random access occasion identifier, a preamble sequence identifier provided in the system information, or any combinations thereof.

In some examples of the method, apparatuses, and non-transitory computer-readable medium described herein, the initialization seed may be further based on one or more of a symbol index of a symbol within a transmission slot that carries the reference signal, a transmission slot number of the transmission slot within a radio frame, a sub-carrier spacing used for transmitting the first random access message, one or more scaling constants, or any combinations thereof. In some examples of the method, apparatuses, and non-transitory computer-readable medium described herein, the polynomial generator may be a closed-form polynomial generator that generates a pseudo-random noise (PN) sequence.

In some examples of the method, apparatuses, and non-transitory computer-readable medium described herein, the reference signal sequence may be a preconfigured gold sequence that may be selected from a set of available preconfigured gold sequences based on the first random access occasion identifier and the first uplink shared channel transmission occasion identifier.

In some examples of the method, apparatuses, and non-transitory computer-readable medium described herein, the reference signal sequence includes a cyclic prefix orthogonal frequency division multiplexing (CP-OFDM) waveform demodulation reference signal (DMRS) sequence.

In some examples of the method, apparatuses, and non-transitory computer-readable medium described herein, the determining the reference signal sequence further may include operations, features, means, or instructions for determining a base sequence based on one or more of a group index, a sequence index, a cyclic shift, or any combinations thereof, indicated in the system information. In some examples of the method, apparatuses, and non-transitory computer-readable medium described herein, the group index may be determined based on one or more of the first uplink shared channel transmission occasion identifier, the first random access occasion identifier, a preamble sequence identifier provided in the system information, or any combinations thereof.

In some examples of the method, apparatuses, and non-transitory computer-readable medium described herein, the group index may be further determined based on a group hopping index provided in the system information, a reference signal sequence hopping index provided in the system information, or any combinations thereof.

In some examples of the method, apparatuses, and non-transitory computer-readable medium described herein, the base sequence may be selected from a set of available base sequences including Zadoff-Chu sequences, computer generated sequences, modified chirp sequences, composite sequences with low peak to average power ratios, or any combinations thereof. In some examples of the method, apparatuses, and non-transitory computer-readable medium described herein, the reference signal sequence includes a discrete Fourier transform spread orthogonal frequency division multiplexing (DFT-s-OFDM) waveform demodulation reference signal (DMRS) sequence.

some examples of the method, apparatuses, and non-transitory computer-readable medium described herein, the system information is transmitted in a system information block (SIB), in an RRC message, or both.

DETAILED DESCRIPTION

Figure 1:
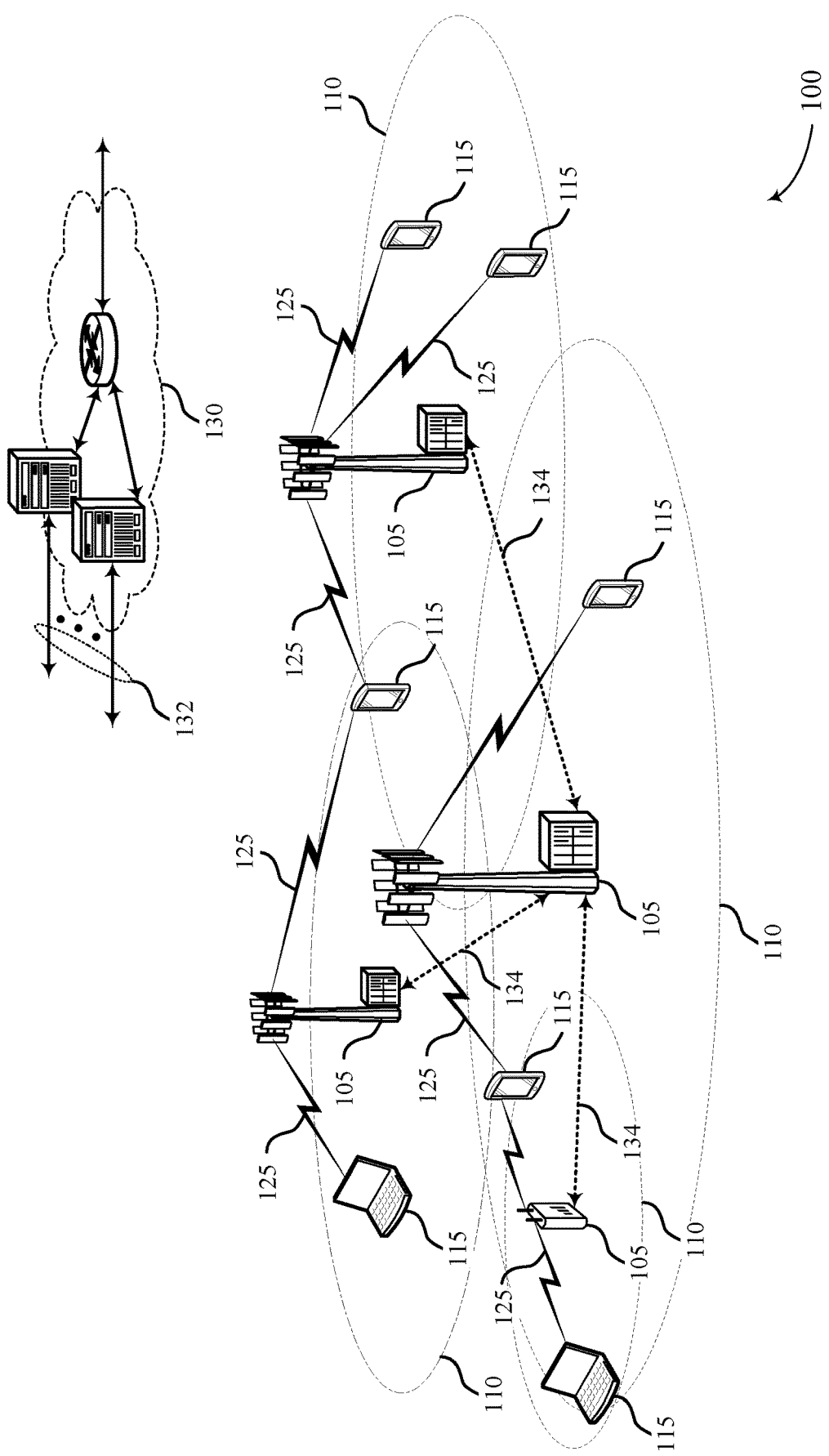
FIG. 1 illustrates an example of a system for wireless communications that supports reference signal transmission techniques for random access messages in accordance with aspects of the present disclosure.

In some network deployment scenarios, a base station and a user equipment (UE) may simultaneously use different random access procedures to meet different requirements for the system. For example, the different random access procedures may include two-step random access channel (RACH) procedures and four-step RACH procedures, and the different requirements may include capacity limitations, latency requirements, reliability requirements, implementation complexity specifications, and the like. In some cases, different physical uplink shared channel (PUSCH) occasions (POs) may be defined that can be used for both or either of the RACH procedures. For example, the different POs may include one or more RACH occasions (ROs) that may be associated with a two-step or four-step RACH procedure. In some cases, a two-step RACH procedure may use ROs separate from a four-step RACH procedure or may share ROs with a four-step RACH procedure but use different sets of preamble sequences.

The two-step RACH procedure may include a first random access message (e.g., msgA) transmitted by a UE, which may include a RACH preamble and a payload, and a second random access message (e.g., msgB) transmitted by a base station in response to the first random access message. In some cases, the UE may transmit the preamble and payload portions of the first random access message in same or different slots and in a same bandwidth, partially overlapping bandwidths, or disjoint bandwidths based on the configuration information. The base station may transmit the configuration information in a system information (SI) transmission or via radio resource control (RRC) signaling. For example, the configuration information may be included in a system information block (SIB) and/or an RRC message.

In some cases, a UE's reception of configuration information may be RRC state-dependent. For example, a UE in RRC connected state may receive configuration information conveyed via RRC signaling and/or via physical layer signaling (e.g., via a SIB). However, a UE that is not in RRC connected state (e.g., a UE in RRC idle state) may only be able to receive configuration information via physical layer signaling (e.g., via a SIB). So in some examples, a base station may include the configuration information in both a SIB message and an RRC message so that UEs in different RRC states can receive the configuration information. Such signaling diversity may be useful when a UE in RRC connected state is nevertheless unable to decode an RRC message that includes the configuration information. For example, the UE may obtain the configuration information from a SIB message even though it is in RRC connected state.

In some cases, a two-step RACH procedure may be configured with one or more POs that span multiple transmission slots. In such cases, reference signal resources for transmitting a reference signal with the first random access message of the two-step RACH procedure may include at least one symbol in each of the multiple transmission slots. In some cases, the reference signal resources within each of the multiple transmission slots may be identified based on the particular PO that is selected to transmit the first random access message. In some cases, a base station may provide system information that indicates two or more available ROs and two or more available POs within each of the two or more available ROs. In such cases, a UE may select a RO and a PO, and determine a reference signal sequence for a reference signal to be transmitted with the first random access message based on identifiers associated with the selected RO and PO. In some cases, a random access preamble for the first random access message may be associated with the particular reference signal resources, with the particular reference signal sequence, or both. The RACH procedure may be configured, in some cases, based on capabilities of the UE and additional factors (e.g., latency targets, traffic loads, number of UEs to be supported, and the like), and the base station may select the two-step RACH procedure to provide enhance RACH capacity, enhanced UE power saving, and synergy with other applications (e.g., positioning, mobility enhancement, etc.).

Such techniques may allow for a base station to configure random access resources in a flexible manner based on particular objectives, such as coverage requirements (e.g., different cell size, coverage balance of preamble sequence and payload info., etc.), estimated payload size, quality of service (QoS) requirements (e.g., latency, reliability, contention-based access availability for deployments that use shared spectrum, etc.), implementation constraints of UE or base station (e.g., radio frequency (RF) tuning gap, buffer size, processing time, etc.), emission requirements (e.g., based on adjacent channel leakage power ratio (ACLR), adjacent channel interference (ACI), etc.), or combinations thereof. Further, such techniques may allow, in the time domain, configurations in which the first random access message preamble and payload may be transmitted in the same or different slots. Additionally or alternatively, such techniques may allow, in the time domain, configurations in which the first random access preamble and payload may be transmitted in the same bandwidth, partially overlapping bandwidths, or disjoint bandwidths. Further, such techniques may allow for enhanced resource utilization efficiency and contention mitigation with a balanced configuration for preamble and reference signal (e.g., demodulation reference signal (DMRS) resources in time-frequency-code domains, and provide for relatively reliable and low-complexity UE activity detection through associations between preamble index and DMRS resource index.

Aspects of the disclosure are initially described in the context of a wireless communications system. Examples of two-step RACH procedures and reference signal configurations are then discussed with reference to exemplary systems, resources, and call flows. Aspects of the disclosure are further illustrated by and described with reference to apparatus diagrams, system diagrams, and flowcharts that relate to reference signal transmission techniques for random access messages.

FIG. 1 illustrates an example of a wireless communications system 100 that supports reference signal transmission techniques for random access messages in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band (NR-U) such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, a UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal blocks (SSBs) on respective directional beams, where one or more SSBs may be included within a synchronization signal (SS) burst.

After receiving the PSS and SSS, the UE 115 may receive a master information block (MIB), which may be transmitted in the PBCH. The MIB may contain system bandwidth information, an SFN, and a physical hybrid automatic repeat request (HARQ) indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

After completing initial cell synchronization, a UE 115 may decode the MIB, SIB1 and SIB2 prior to accessing the network. The MIB may be transmitted on PBCH and may utilize the first 4 OFDMA symbols of the second slot of the first subframe of each radio frame. It may use the middle 6 RBs (72 subcarriers) in the frequency domain. The MIB carries a few important pieces of information for UE initial access, including: downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code.

After reading a MIB (either a new version or a copy), the UE 115 may can try different phases of a scrambling code until it gets a successful cycle redundancy check (CRC). The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames.

After the UE 115 decodes SIB2, it may initiate a RACH procedure (e.g., a two-step or four-step RACH procedure). In some cases, wireless devices operating in licensed or unlicensed spectrum within wireless communications system 100 may initiate a two-step RACH procedure to reduce delay in establishing communication with a base station 105 (e.g., as compared to a four-step RACH procedure). In some cases, the two-step RACH procedure may operate regardless of whether a wireless device (e.g., a UE 115) has a valid timing advance (TA). For example, a UE 115 may use a valid TA to coordinate the timing of its transmissions to a base station 105 (e.g., to account for propagation delay) and may receive the valid TA as part of the two-step RACH procedure. Additionally, the two-step RACH procedure may be applicable to any cell size, may work regardless of whether the RACH procedure is contention-based or contention-free, and may combine multiple RACH messages from a four-step RACH procedure. For example, the two-step RACH procedure may include a first message (e.g., a message A (MsgA)) that combines the Msg1 and Msg3 of the four-step RACH procedure and a second message (e.g., a message B (MsgB)) that combines the Msg2 and Msg4 of the four-step RACH procedure. In some cases, the two-step RACH procedure may result in a reduction in signaling overhead and latency, an enhanced RACH capacity, power savings for the UE 115, and provide synergy with other applications (e.g., positioning, mobility enhancement, etc.).

In some network deployment scenarios (e.g., for NR), two-step RACH procedures and four-step RACH procedures may be used simultaneously to meet different requirements for the system. For example, the different requirements may include capacity limitations, latency requirements, reliability requirements, implementation complexity specifications, etc. Accordingly, different POs may be defined that can be used for both or either RACH procedure, and the different POs may include one or more ROs. The ROs may include time and frequency resources allocated for physical RACH (PRACH) transmissions. Additionally, up to 64 preamble sequences may be configured for each RO. In some cases, a two-step RACH procedure may use RACH occasions separate from a four-step RACH procedure or may share RACH occasions with a four-step RACH procedure but use different sets of preamble sequences. Additionally or alternatively, the POs may include time and frequency resources allocated for MsgA PUSCH transmissions (e.g., and/or for transmissions associated with the four-step RACH procedure).

In some examples of the two-step RACH procedure, a base station may configure different sets of POs and/or ROs for different RRC states (e.g., the POs and/or ROs may be RRC state-specific). For instance, the base station may configure a first set of POs and/or ROs for a first RRC state (e.g., RRC connected) and a second set of POs and/or ROs for a second RRC state (e.g., RRC idle). In such an example, a UE may select a PO and/or RO based on the state of the RRC state of the UE. For instance, the UE may first select the set of POs/ROs that is associated with (e.g., configured for) the current RRC state of the UE. The UE may then select a PO/RO from the set of POs/ROs associated with the current RRC state of the UE. Thus, selection of DMRS resources may be based on the RRC state of a UE.

Wireless communications system 100 may include techniques as described herein for two-step RACH configurations in which one or more POs may span multiple transmission slots, and reference signal resources for transmitting a reference signal with the first random access message of the two-step RACH procedure may include at least one symbol in each of the multiple transmission slots. In some cases, the reference signal resources within each of the multiple transmission slots may be identified based on the particular PO that is selected to transmit the first random access message. In some cases, a base station 105 may provide system information that indicates two or more available ROs and two or more available POs within each of the two or more available ROs. In such cases, a UE 115 may select a RO and a PO, and determine a reference signal sequence for a reference signal to be transmitted with the first random access message based on identifiers associated with the selected RO and PO. In some cases, a random access preamble for the first random access message may be associated with the particular reference signal resources, with the particular reference signal sequence, or both.

Figure 2:
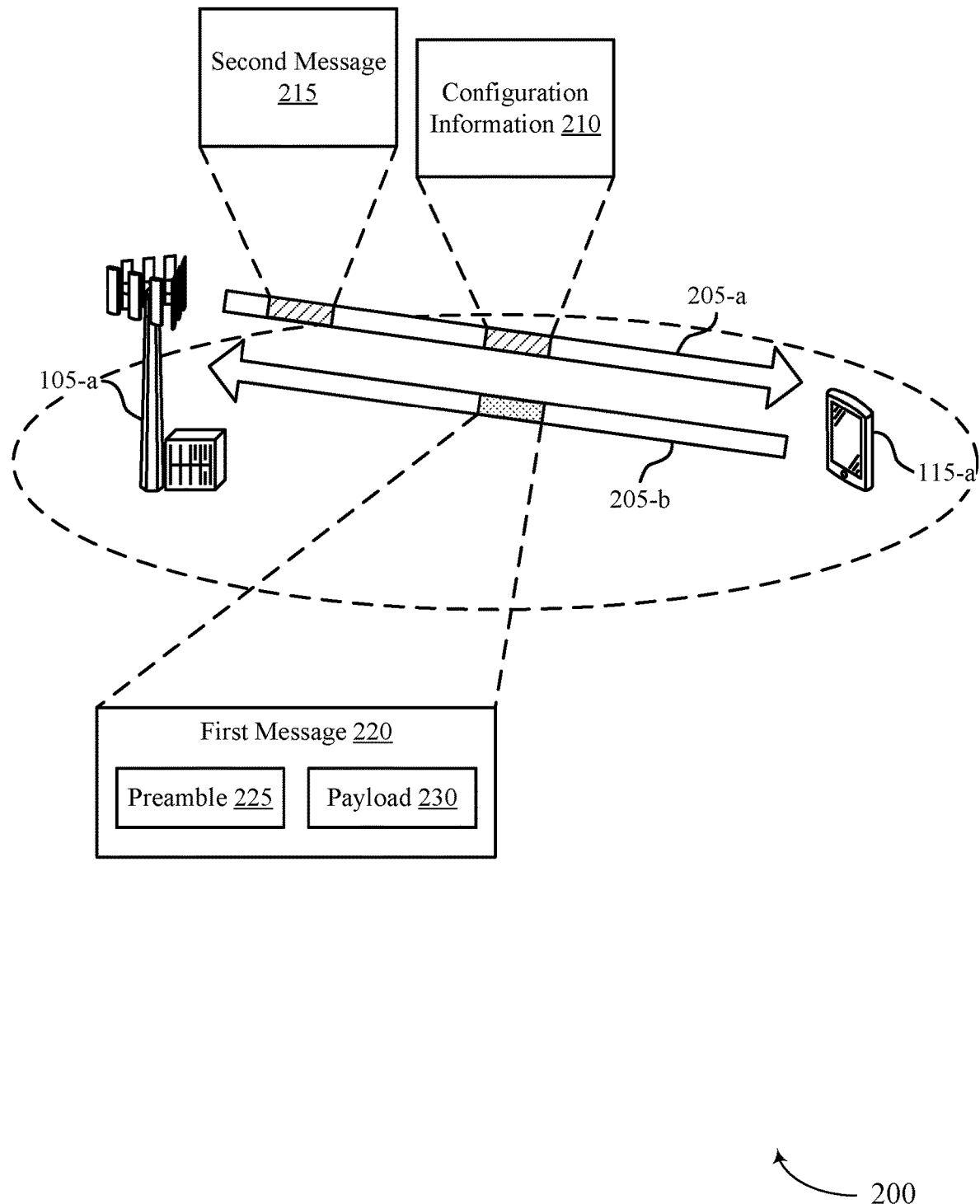
FIG. 2 illustrates an example of a portion of a wireless communications that supports reference signal transmission techniques for random access messages in accordance with aspects of the present disclosure.

FIG. 2 illustrates an example of a wireless communications system 200 that supports reference signal transmission techniques for random access messages in accordance with aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115, respectively, as described above with reference to FIG. 1. In some cases, UE 115-*a* may perform a RACH procedure to connect with base station 105-*a* as part of an initial cell selection, a cell reselection, or a similar access procedure. Accordingly, base station 105-*a* may transmit downlink messages to UE 115-*a* on resources of a carrier 205-*a*, and UE 115-*a* may transmit uplink messages to base station 105-*a* on resources of a carrier 205-*b*. In some cases, carriers 205-*a* and 205-*b* may be a same carrier or may be separate carriers. For example, base station 105-*a* may broadcast the downlink messages on time and frequency resources reserved for broadcasted transmissions, which may be different than resources allocated for uplink messages from UE 115-*a* or other UEs 115 in the coverage area of base station 105-*a*. Additionally or alternatively, UE 115-*a* may be in a connected state (e.g., RRC_CONNECTED state) with base station 105-*a*, and downlink messages and uplink messages may be transmitted on a same carrier established previously.

As described herein, UE 115-*a* may perform a two-step RACH procedure to establish a connection with base station 105-*a* (e.g., initial connection, reestablishment, etc.). Accordingly, base station 105-*a* may transmit configuration information 210 to provide one or more configurations for UE 115-*a* to transmit different portions of a first message 220 (e.g., MsgA) of the two-step RACH procedure. For example, first message 220 may include a preamble 225 and a payload 230, and configuration information 210 may provide configurations for ROs and POs of two-step RACH procedures for UE 115-*a* to transmit preamble 225 and payload 230, respectively (e.g., preamble 225 is transmitted in a RACH occasion and payload 230 is transmitted in a PUSCH occasion). Responsive to the first message 220, the base station 105-*a* may transmit a second message 215 (e.g., msgB) which may include a response to the first message 220.

Before transmitting first message 220 with preamble 225 and payload 230, UE 115-*a* may determine a first message configuration based on the configuration information 210. Based on first message configuration, UE 115-*a* may select a PO and RO for the first message 220. In some cases, base station 105-*a* may transmit configuration information 210 in an SI transmission (e.g., if UE 115-*a* is not connected to base station 105-*a*). Additionally or alternatively, if UE 115-*a* is in a connected state (e.g., RRC_CONNECTED state) with base station 105-*a*, base station 105-*a* may transmit configuration information 210 via one or both of SI or RRC signaling (e.g., which may provide a higher degree of flexibility in resource allocations). For example, the different occasions to transmit configuration information 210 may provide more techniques for base station 105-*a* to indicate resource allocations for transmitting preamble 225 and/or payload 230.

Additionally, UE 115-*a* may determine time and frequency resources for transmitting preamble 225 and payload 230. In the time domain, UE 115-*a* may transmit preamble 225 and payload 230 of first message 220 within a same slot or on different slots. For example, configuration information 210 may include a set of preamble formats that UE 115-*a* can use for preamble 225 and a configurable transmission gap that enables whether preamble 225 and payload 230 are transmitted within a same slot or not. Each preamble format or subsets of the preamble formats may correspond to different time and frequency resources, which may indicate when payload 230 can be transmitted after preamble 225. Additionally, the transmission gap may indicate a time duration between transmitting preamble 225 and transmitting payload 230, which may result in payload 230 being transmitted in a separate slot than preamble 225 if the transmission gap is long enough to extend into the separate slot. In the frequency domain, UE 115-*a* may transmit preamble 225 and payload 230 of first message 220 in a same bandwidth, in partially overlapping bandwidths, or in disjoint bandwidths based on information in configuration information 210. For example, base station 105-*a* may configure ROs and POs for the respective portions of first message 220 with a same bandwidth or partially overlapping bandwidths.

In some cases, each RO may be associated with one or multiple POs. For example, one RO may be associated with multiple POs, where different subsets of RACH preambles in the RO correspond to one or multiple POs (e.g., a first RACH preamble subset may correspond to a first resource set that includes one or more POs, and a second RACH preamble subset may correspond to a second resource set that includes one or more different (e.g., or overlapping) POs). Each PO in a respective resource set may include a same modulation and coding scheme (MCS), payload size, and waveform configuration. Base station 105-*a* may configure the association between the ROs and the POs based on partitioning in the code domain (e.g., by preamble sequence groupings with the different preamble subsets). Accordingly, base station 105-*a* may indicate different subsets of preambles are associated with different POs configurations (e.g., resource sets with same MCS, payload size, and waveform configurations) in configuration information 210.

Additionally, as described above, in cases where two-step RACH configurations include one or more POs that span multiple transmission slots, reference signal resources for transmitting a reference signal with the first message 220 may include at least one symbol in each of the multiple transmission slots. In some cases, the reference signal resources within each of the multiple transmission slots may be identified based on the particular PO that is selected to transmit the first message 220. In some cases, a base station 105-*a* may provide system information that indicates two or more available ROs, and two or more available POs within each of the two or more available ROs. In such cases, UE 115-*a* may select a RO and a PO, and determine a reference signal sequence for a reference signal to be transmitted with the first message 220 based on identifiers associated with the selected RO and PO. In some cases, the random access preamble for the first message 220 may be associated with the particular reference signal resources, with the particular reference signal sequence, or both.

For example, in some cases multiple demodulation reference signal (DMRS) symbols can be configured per PO (i.e., N>1 DMRS symbols per PO), and the DMRS symbol location can be front-loaded within each slot, distributed within each slot, or combinations thereof. Further, if the PO spans K slots (i.e., K>1), the number of DMRS symbols within each slot can be the same or different (e.g., K=2, N=4 where two slots each have two DMRS symbols, or K=2, N=3 where a first slot has two DMRS symbols while a second slot has one DMRS symbol). In such cases, the reference signal resources may be distributed across slots, and multiple reference signal symbols may be configured within one or more of the slots. In some cases, particular RACH preambles may be associated with different reference signal resources, which may assist the base station 105-*a* in identifying transmissions of the UE 115-*a*. Such reference signal resource may allow for more reliable demodulation of the first message 220, which may enhance efficiency, latency, and reliability of the wireless communications system 200.

Additionally, in some cases, an orthogonal cover code (OCC) may be applied to the first message 220. An OCC may allow the base station 105-a to decode concurrent transmissions of multiple UEs 115 through multiple access techniques (e.g., non-orthogonal multiple access (NOMA) successive interference cancellation (SIC) and multi-user decoding (MUD) techniques). In some cases, an OCC may be applied to a reference signal, which may be extended across multiple DMRS symbols per PO, which may allow for enhanced reliability in detection of the DMRS. In some cases, the OCC may be a binary OCC, a non-binary OCC, or quasi-orthogonal sequence, that may be configured based on the configuration information 210. In some cases, the OCC may be selected from an OCC codebook (e.g., one or more tables that map particular OCCs to RACH preambles, POs, ROs, DMRS resources, or any combinations thereof). In some cases, one or multiple OCC codebooks may be configured by the configuration information 210. In some cases, an OCC extension may be applied across all DMRS symbols of a PO as provided in a single OCC codebook. In other cases, multiple OCC codebooks may be provided, and DMRS symbols within a PO can be grouped into multiple subsets in which one OCC is specified for each subset individually, and different OCC codebooks can be configured with similar of different alphabets (e.g., binary, non-binary, or a hybrid of binary and non-binary). Additionally, OCC extension may be separately or jointly considered in frequency domain.

As discussed herein, payload 230 of the first message 220 may include DMRS symbols, and in some cases DMRS sequences for the DMRS symbols may be selected based on the particular PO, RO, or combinations thereof, that are selected for the first message 220 transmission. For example, for a given number of DMRS symbols per PO, DMRS sequence generation be performed according to a generation formula that is a function of a resource index of the PO, RO, or combinations thereof. For example, in some cases PUSCH transmissions may use a cyclic prefix OFDM (CP-OFDM) waveform, and DMRS sequences may be generated based on a gold sequence or other pseudo0noins (PN) PN sequences with closed-form generator polynomials. In such cases, a resource index of the selected PO, RO, a RACH preamble sequence index, or any combinations thereof may be used to determine the DMRS sequence. For example, if a closed-form polynomial generator is used to generate the DMRS sequence, an initialization seed ($c_{init}$) of the polynomial generator may be based on the one or more index values. In one specific example, the initialization seed may be determined according to:

$$c_{init} \triangleq (2^{17}(N_{symb}^{slot}n_{s,f}^{\mu} + l + 1)(N_{ID}^{2} + 1) + N_{ID}^{2}) \mod 2^{31}$$

where $$N_{ID}^{2} \triangleq (2N_{ID}^{cell} + K_1 \cdot P_{ID} + K_2 \cdot R_{ID} + K_3 \cdot S_{ID}) \mod 65535 \quad (1)$$

and $K_i > 0$ are scaling constants, i=1, 2, 3;
(2) $l$ is the OFDM symbol index within the slot carrying DMRS symbols;
(3) $n_{s,f}^{\mu}$ is the slot number within a frame with subcarrier spacing (SCS) configuration $\mu$; and
(4) $P_{ID}$, $R_{ID}$, and $S_{ID}$ denote the index of PO, RO and preamble sequence in use, respectively.

In other cases, PUSCH transmissions may use a DFT-s-OFDM waveform, and DMRS sequences may be generated based on defined base sequences $\{r_{u,v}^{\alpha}\}$. In addition, in some cases, Zadoff-Chu (ZC) sequences, computer generated sequences (CGS), modified chirp sequences, or other composite low peak-to-average-power (PAPR) sequences may be configured in the configuration information 210. In some cases, the base sequences may be divided into multiple groups, with u denoting the group number and v denoting the base sequence within a given group. In some cases, the group index u, sequence index v, a cyclic shift $\alpha$, or any combinations thereof may be formulated as a function of one or more of $P_{ID}$, $R_{ID}$, or $S_{ID}$. For example:

$$u \triangleq (f_{gh} + n_{ID}^{RS,2}) \mod Q,$$

where $$n_{ID}^{RS,2} \triangleq (K_4 \cdot P_{ID} + K_5 \cdot R_{ID} + K_6 \cdot S_{ID});$$

(2) $P_{ID}$, $R_{ID}$, and $S_{ID}$ denote the index of PO, RO and preamble sequence in use, respectively;
(3) $K_i \geq 0$ are scaling constants, i=4, 5, 6;
(4) Q is a constant (e.g., Q=30);
(5) $f_{gh}$ denotes a hopping mode index, which may be jointly defined with sequence index v, and, if neither group or sequence hopping is enabled: $f_{gh}=v=0$, and if group hopping is enabled and sequence hopping is disabled, the initialization seed of PN sequence c(i) can be initialized with:

$$c_{init} \triangleq \lfloor n_{ID}^{RS,2} / 30 \rfloor \text{ and}$$

$$f_{gh} = \sum_{m=0}^{7} c(8(N_{symb}^{slot}n_{s,f}^{\mu} + l) + m) \mod 30$$

$$v = 0.$$

Further. if group hopping is disabled and sequence hopping is enabled, the initialization seed of PN sequence c(i) can be initialized with $$c_{init} \triangleq n_{ID}^{RS,2} \text{ and}$$

$$f_{gh} = 0$$

$$v = \begin{cases} c(N_{symb}^{slot}n_{s,f}^{\mu} + l) & \text{if } M_{zc} \geq 6N_{sc}^{RB} \\ 0 & \text{otherwise} \end{cases}$$

Figure 3:
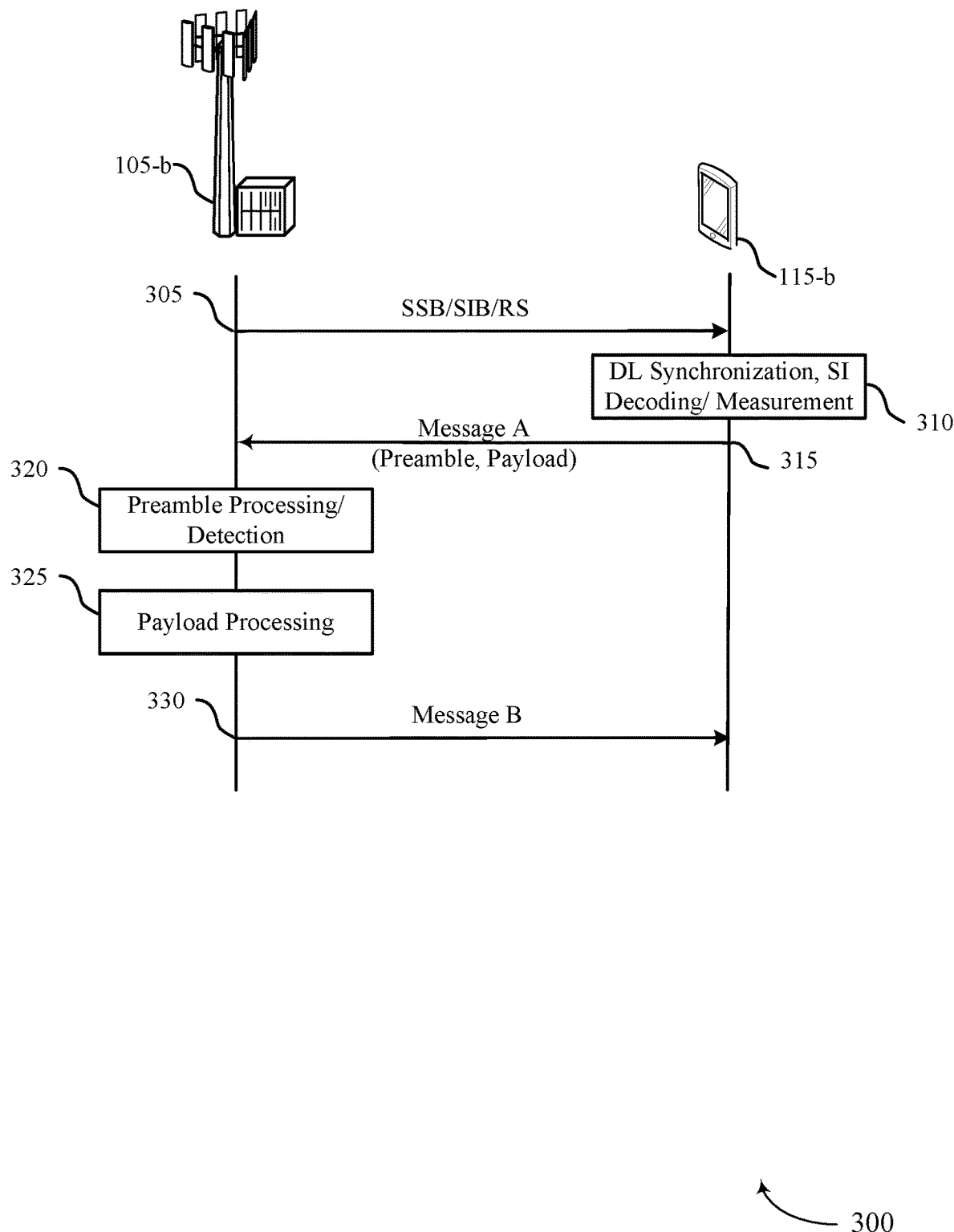
FIG. 3 illustrates an example of a two-step random access channel (RACH) procedure that supports reference signal transmission techniques in accordance with aspects of the present disclosure.

FIG. 3 illustrates an example of a process flow 300 that supports reference signal transmission techniques for random access messages in accordance with aspects of the present disclosure. In some examples, process flow 300 may implement aspects of wireless communications system 100 or 200. Process flow 300 may include a base station 105-b and a UE 115-b, which may be examples of corresponding base stations 105 and UEs 115, respectively, as described above with reference to FIGS. 1-2. Additionally, process flow 300 may illustrate a two-step RACH procedure as described herein for UE 115-a to establish a connection with base station 105-b for subsequent communications.

At 305, base station 105-a may transmit a synchronization signal block (SSB), system information block (SIB), reference signal (RS), or a combination thereof to indicate configuration information to UE 115-b for performing the two-step RACH procedure.

At 310, UE 115-b may perform a downlink synchronization based on the received SSB to synchronize with base station 105-b prior to beginning the two-step RACH procedure. Additionally, UE 115-b may decode and measure any SI transmissions received from base station 105-b (e.g., SIB, RS, etc.) to identify configuration information for transmitting a first message of the two-step RACH procedure. For example, by decoding and measuring the SI, UE 115-b may identify a periodicity for transmitting different portions of the first message.

At 315, UE 115-b may transmit, to base station 105-b, the first random access message (e.g., msgA) of the two-step RACH procedure. The first random access message may include a preamble (e.g., MsgA preamble) transmitted in one or more ROs configured by the base station 105-b to carry the preamble. Additionally, the first random access message may include a payload (e.g., MsgA payload), where the payload is transmitted in one or more POs associated with the RO as described herein. The payload may include one or more DMRS symbols that are determined based at least in part on the RO, PO, or combinations thereof. Further, the DMRS sequence may be determined based at least in part on the RO, PO, or combinations thereof.

At 320, base station 105-b may process the preamble of the first random access message. Accordingly, if the preamble is detected and intended for base station 105-b from UE 115-b, at 325, base station 105-b may then process the payload of the first random access message.

Based on correctly receiving and processing both portions of the first random access message, at 330, base station 105-b may then transmit a second random access message (e.g., MsgB) of the two-step RACH procedure to UE 115-b. Subsequently, if UE 115-b correctly receives the second random access message (e.g., with no interference or is able to decode the message with any interference), the two-step RACH procedure may be complete, and UE 115-b and base station 105-b may communicate based on the successful RACH procedure.

Figure 4A:
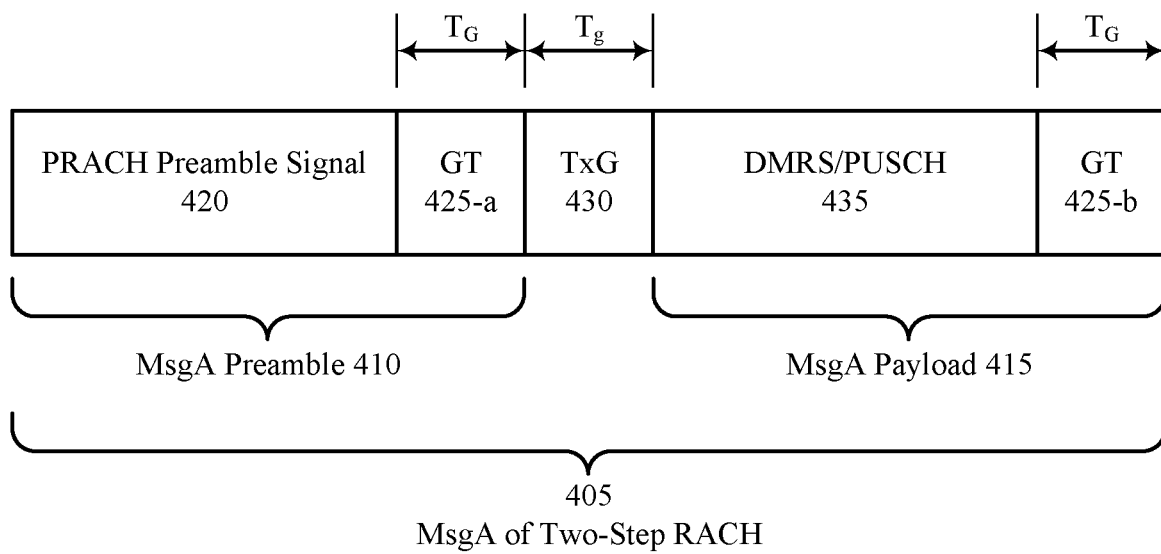
FIG. 4A illustrates an example of a channel structure that supports reference signal transmission techniques for random access messages in accordance with aspects of the present disclosure.

FIG. 4A illustrates an example of a channel structure 400 that supports reference signal transmission techniques for random access messages in accordance with aspects of the present disclosure. In some examples, channel structure 400 may implement aspects of wireless communications system 100 or 200. In some cases, channel structure 400 may represent the structure of a first message 405 (e.g., MsgA) for a two-step RACH procedure as described herein. Accordingly, in some cases, a UE 115 may transmit first message 405 to a base station 105 according to the channel structure 400. The channel structure 400 of the first message 405 may support a contention-based random access (CBRA) (e.g., RACH) procedure on shared time-frequency-code resources In some cases, first message 405 may include a preamble 410 and a payload 415 as described above, where transmission bandwidths for the preamble 410 and the payload 415 may be the same or different. The preamble 410 may include a PRACH preamble signal 420, where the preamble 410 (e.g., with PRACH preamble signal 420) serves multiple purposes. For example, the preamble 410 may facilitate timing offset estimation by the base station 105. Additionally, the preamble 410 may supply an early indication of MCS, payload size, and resource allocation for the payload 415 (e.g., which may provide a more efficient solution than an uplink control information (UCI) piggyback on a PUSCH that includes the payload). In some cases, the resource allocation for the payload 415 may be based on a pre-defined mapping rule between the preamble 410 and the payload 415 that is indicated in configuration information from the base station 105. The payload 415 may include a DMRS/PUSCH 435 portion for transmission of the payload of the first message 405, where the payload 415 may include a configurable payload size for different use cases and RRC states. For example, the payload 415 may include a minimum payload size (e.g., of 56/72 bits) and may not include a maximum (e.g., upper bound) payload size. In some cases, the payload 415 may include 1000 bits of small data from a user plane (UP) and/or control plane (CP).

Additionally, between each portion of first message 405 (e.g., between preamble 410 and payload 415), a guard time (GT) 425 may exist. For example, the base station 105 may configure the GT 425 to mitigate inter symbol interference (ISI) and/or inter carrier interference (ICI) for asynchronous uplink communications. In some cases, GT 425 may be referenced as a guard band (GB). A first GT 425-a may exist between preamble 410 and payload 415, and a second GT 425-b may exist after payload 415 and a subsequent preamble 410. Additionally, the base station 105 may also configure a transmission gap (e.g., TxG) 430 to extend the time between preamble 410 and payload 415. The transmission gap 430 may extend the first message 405 to occur over more than one symbol (e.g., or different TTI length). In some cases, each GT 425 may have a duration equal to $T_G$, and the transmission gap 430 may have a duration equal to Ty.

Figure 4B:
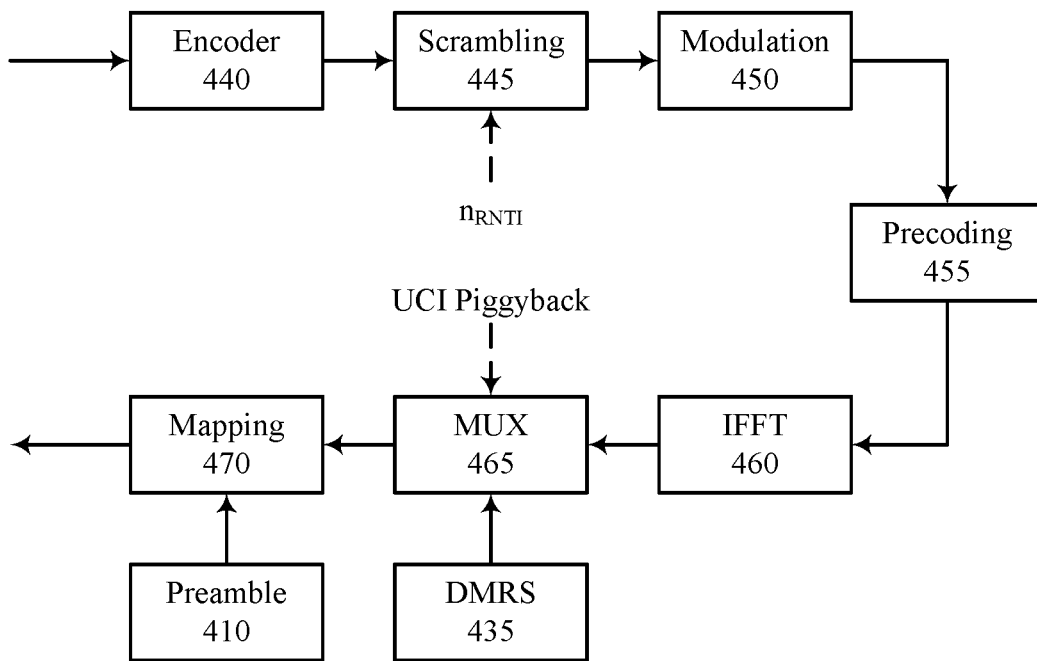
FIG. 4B illustrates an example of a transmit chain that supports reference signal transmission techniques for random access messages in accordance with aspects of the present disclosure.

FIG. 4B illustrates an example of a transmit chain 401 that supports two-step RACH in accordance with aspects of the present disclosure. In some examples, transmit chain 401 may implement aspects of wireless communications systems 100 or 200. Transmit chain 401 may illustrate how a first message of a two-step RACH procedure (e.g., MsgA) is configured (e.g., encoded, scrambled, mapped, etc.) by a UE 115 prior to the UE 115 transmitting the first message.

The UE 115 may use an encoder 440 for encoding a payload portion of the first message. In some cases, the encoder 440 may be a low-density parity check (LDPC) encoder. After encoding the payload, the UE 115 may pass the payload through a scrambling 445, which may scramble the encoded bits. After scrambling the encoded bits, the UE 115 may then perform modulation 450. In some cases, the modulation 450 may include a linear modulation. Subsequently, the UE 115 may perform a precoding 455 (e.g., transform precoding) on the modulated bits. The UE 115 may then use an inverse fast Fourier transform (IFFT) 460 after precoding to transform the bits. After the IFFT 460, the UE 115 may use a multiplexer (MUX) 465. In some cases, with the multiplexer 465, the UE 115 may multiplex a DMRS 435 (e.g., in reference signal resources and using a DMRS sequence as described herein). Subsequently, the UE 115 may perform a mapping 470. In some cases, the UE 115 may perform the mapping as based at least in part on the preamble 410 (e.g., as referenced by the preamble 410 in FIG. 4A). For example, the preamble 410 may indicate a pre-defined mapping rule between a preamble and the payload, reference signal resources, OCC, and/or reference signal sequence, of the first message. The UE 115 may then transmit the first message after performing the different steps.

Figure 5:
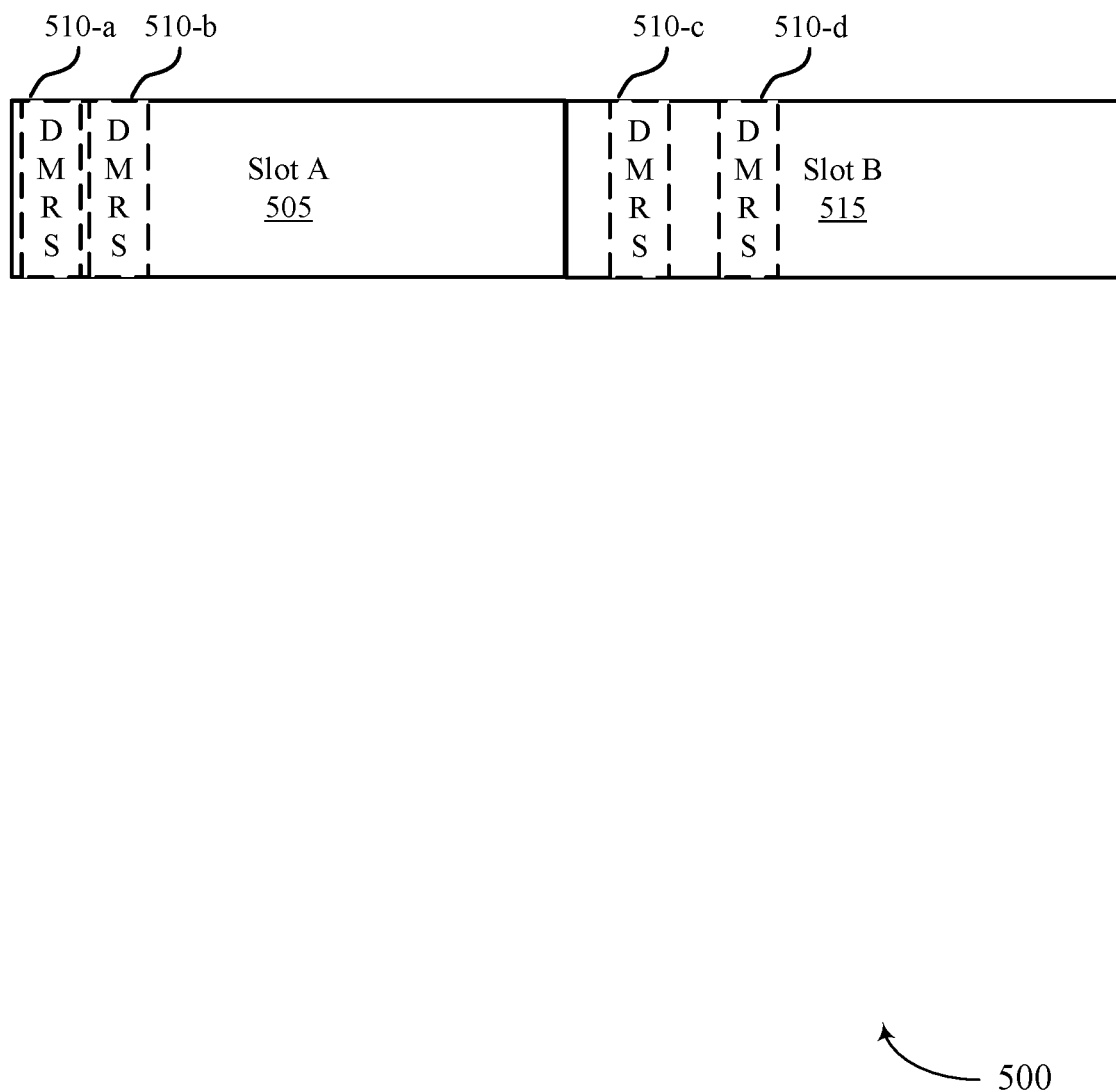
FIG. 5 illustrates an example of a slot structure that supports reference signal transmission techniques for random access messages in accordance with aspects of the present disclosure.

FIG. 5 illustrates an example of a slot structure 500 that supports reference signal transmission techniques for random access messages in accordance with aspects of the present disclosure. In some examples, slot structure 500 may implement aspects of wireless communications system 100 or 200. As indicated with reference to FIGS. 1 through 4, in some cases a PO may span multiple slots, and DMRS resources may be configured in each of the slots in accordance with techniques as discussed herein.

In the example of FIG. 5, a first slot 505 (slot A) and a second slot 515 (slot B) may be configured in a selected PO. Within each of the first slot 505 and the second slot 515, multiple DMRS symbols 510 may be configured (i.e., N>1 DMRS symbols 510 per PO). The DMRS symbol 510 locations may be front-loaded within each slot, distributed within each slot, or combinations thereof. In the example of FIG. 5, a first DMRS symbol 510-*a* and a second DMRS symbol 510-*b* may be front loaded within the first slot 505, and a third DMRS symbol 510-*c* and a fourth DMRS symbol 510-*a* may be distributed within the second slot 515. While a same number of DMRS symbols 510 are illustrated in each slot in this example, in other cases the number of DMRS symbols 510 within each slot can be different (e.g., K=2, N=3 where a first slot has two DMRS symbols while a second slot has one DMRS symbol). In some cases, particular RACH preambles may be associated with different reference signal resources, which may assist the base station in identifying transmissions of the UE. In some cases, an OCC may be applied to the slot structure 500 in accordance with techniques such as discussed with reference to FIG. 2.

Figure 6:
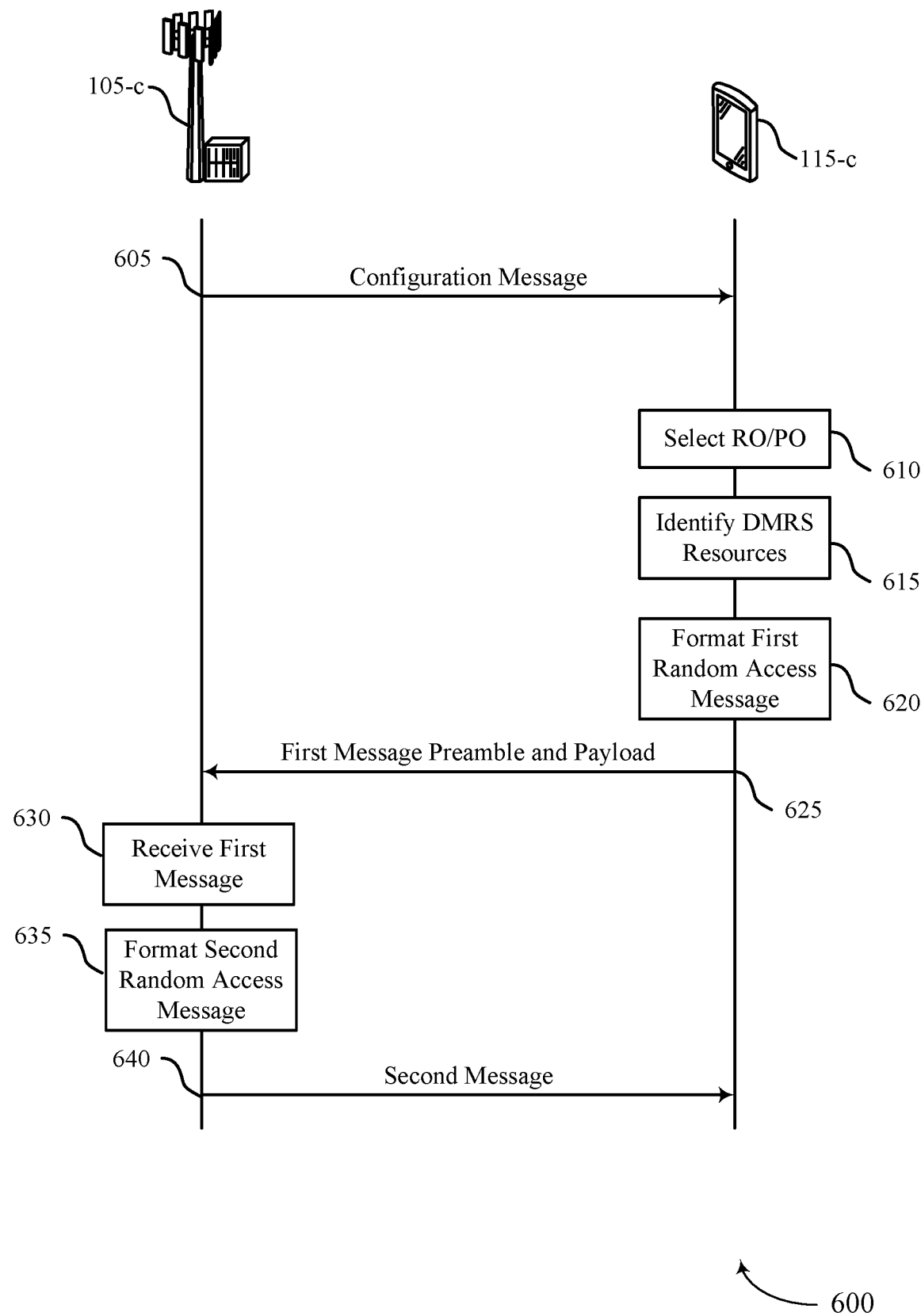
FIG. 6 illustrates an example of a process flow that supports reference signal transmission techniques for random access messages in accordance with aspects of the present disclosure.

FIG. 6 illustrates an example of a process flow 600 that supports reference signal transmission techniques for random access messages in accordance with aspects of the present disclosure. In some examples, process flow 600 may implement aspects of wireless communications system 100 or 200. Process flow 600 may include a base station 105-*c* and a UE 115-*c*, which may be examples of corresponding base stations 105 and UEs 115, respectively, as described above with reference to FIGS. 1-5.

In the following description of the process flow 600, the operations between UE 115-*c* and base station 105-*c* may be transmitted in a different order than the order shown, or the operations performed by base station 105-*c* and UE 115-*c* may be performed in different orders or at different times. Certain operations may also be left out of the process flow 600, or other operations may be added to the process flow 600. It is to be understood that while base station 105-*c* and UE 115-*c* are shown performing a number of the operations of process flow 600, any wireless device may perform the operations shown.

At 605, the base station 105-*c* may transmit, and the UE 115-*c* may receive, a configuration message for a two-step RACH procedure. In some cases, the configuration message may include configuration information for transmission of a preamble and transmission of a payload (e.g., configured ROs, POs, preamble sequences, DMRS resource/sequences, etc.), the preamble and the payload associated with a first message of the two-step RACH procedure (e.g., MsgA). In some cases, the UE 115-*c* may receive the configuration message via RRC signaling or via an SI transmission.

At 610, UE 115-*c* may select a particular RO and PO for transmission of a first message. In some cases, UE 115-*c* may select the RO/PO based on an amount of data that is to be transmitted in the first message, for example. In some cases, the configuration message may include an indication of a subset of ROs and POs from which the UE 115-*c* may make such a selection.

At 615, the UE 115-*c* may identify DMRS resources for the first random access message. For example, the UE 115-*c* may identify DMRS resources for DMRS transmissions in a payload portion of the first random access message. In some cases, the UE 115-*c* may select a random access preamble for the first random access message (e.g., based on a set of available RACH preambles configured by the base station 105-*c* for the UE 115-*c*), and the DMRS resources may be associated with a particular preamble. In some cases, the DMRS resources may be determined based on the particular PO that is selected for transmission of the payload. In some cases, the PO may span multiple slots, and the DMRS resources also may span the multiple slots. In some cases, the DMRS resources may be front loaded within one or more of the slots, distributed in one or more of the slots, of combinations thereof.

At 620, the UE 115-*c* may format the first random access message. In some cases, the first random access message may be formatted with a selected preamble and payload that are determined based on the configuration information provided by the base station 105-*c*. Further, the payload may include reference signal transmissions in accordance with the techniques discussed herein.

At 625, UE 115-*c* may transmit, to base station 105-*c*, the first random access message, which may include the preamble and payload. In some cases, UE 115-*c* may transmit the preamble, and them may transmit the payload after an identified transmission gap. Additionally, the preamble and the payload of the first message may be transmitted within a same slot or on different slots. In some cases, the preamble and the payload of the first message also may be transmitted within a same bandwidth, partially overlapping bandwidths, or disjoint bandwidths.

At 630, the base station 105-*c* may receive the first message. In some cases, the base station 105-*c* may perform preamble detection, and then perform payload processing based at least in part on whether the preamble of the UE 115-*c* is successfully detected. At 635, the base station 105-*c* may format a second random access message (e.g., msgB), and at 640 may transmit the second random access message to the UE 115-*c*. In some cases, the second random access message may include information to establish or reestablish a RRC connection.

Figure 7:
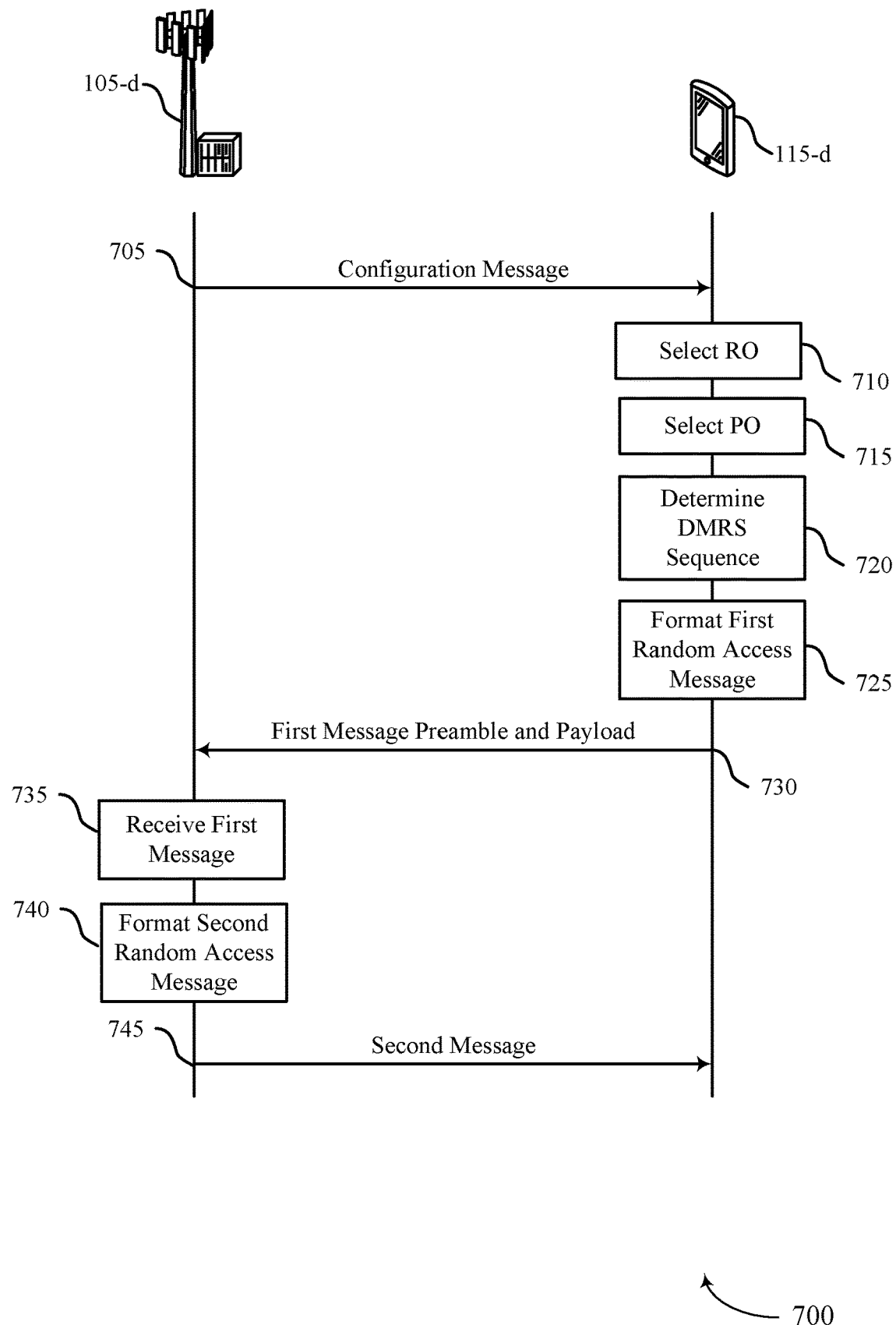
FIG. 7 illustrates an example of a process flow that supports reference signal transmission techniques for random access messages in accordance with aspects of the present disclosure.

FIG. 7 illustrates an example of a process flow 700 that supports reference signal transmission techniques for random access messages in accordance with aspects of the present disclosure. In some examples, process flow 700 may implement aspects of wireless communications system 100. Process flow 700 may include a base station 105-*d* and a UE 115-*d*, which may be examples of corresponding base stations 105 and UEs 115, respectively, as described above with reference to FIGS. 1-6.

In the following description of the process flow 700, the operations between UE 115-*d* and base station 105-*d* may be transmitted in a different order than the order shown, or the operations performed by base station 105-*d* and UE 115-*d* may be performed in different orders or at different times. Certain operations may also be left out of the process flow 700, or other operations may be added to the process flow 700. It is to be understood that while base station 105-*d* and UE 115-*d* are shown performing a number of the operations of process flow 700, any wireless device may perform the operations shown.

At 705, the base station 105-*d* may transmit, and the UE 115-*d* may receive, a configuration message for a two-step RACH procedure. In some cases, the configuration message may include configuration information for transmission of a preamble and transmission of a payload (e.g., configured ROs, POs, preamble sequences, DMRS resource/sequences, etc.), the preamble and the payload associated with a first message of the two-step RACH procedure (e.g., MsgA). In some cases, the UE 115-*d* may receive the configuration message via RRC signaling or via an SI transmission.

At 710, UE 115-*d* may select a particular RO for transmission of a first message. In some cases, UE 115-*d* may select the RO based on information in the configuration message, such as a subset of ROs that are available for selection by the UE 115-*d*. In some cases, one or more ROs may include multiple POs, and at 715, the UE 115-*d* may select a PO from available POs for the selected RO. In some cases, for example, the PO may be selected based on an amount of data that is to be transmitted in the first message.

At 720, the UE 115-*d* may determine a DMRS sequence for a payload portion of a first random access message. In some cases, the DMRS sequence may be selected based at least in part on one or more of an index of the selected RO, an index of the selected PO, a preamble index of a selected preamble, or any combinations thereof. In some cases, the DMRS sequence may be determined based on an initialization seed that is a function of the RO index, PO index, preamble index, or combinations thereof, as discussed herein.

At 725, the UE 115-*d* may format the first random access message. In some cases, the first random access message may be formatted with a selected preamble and payload that are determined based on the configuration information provided by the base station 105-*d*. Further, the payload may include DMRS symbols and DMRS sequences in accordance with the techniques discussed herein.

At 730, UE 115-*d* may transmit, to base station 105-*d*, the first random access message, which may include the preamble and payload. In some cases, UE 115-*d* may transmit the preamble, and them may transmit the payload after an identified transmission gap. Additionally, the preamble and the payload of the first message may be transmitted within a same slot or on different slots. In some cases, the preamble and the payload of the first message also may be transmitted within a same bandwidth, partially overlapping bandwidths, or disjoint bandwidths.

At 735, the base station 105-*d* may receive the first message. In some cases, the base station 105-*d* may perform preamble detection, and then perform payload processing based at least in part on whether the preamble of the UE 115-*d* is successfully detected. At 740, the base station 105-*d* may format a second random access message (e.g., msgB), and at 745 may transmit the second random access message to the UE 115-*d*. In some cases, the second random access message may include information to establish or reestablish a RRC connection.

Figure 8:
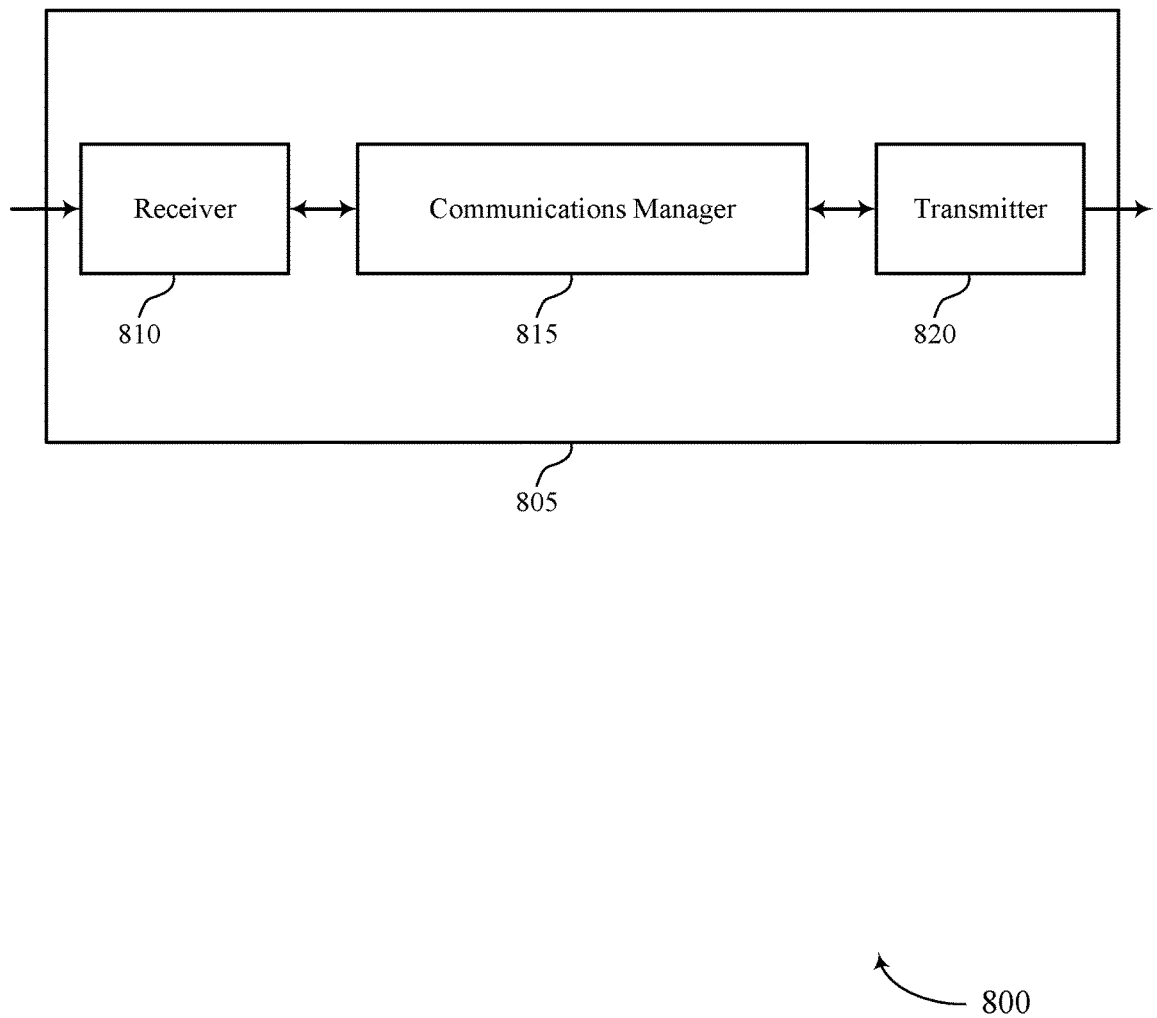
FIGS. 8 and 9 show block diagrams of devices that support reference signal transmission techniques for random access messages in accordance with aspects of the present disclosure.

FIG. 8 shows a block diagram 800 of a device 805 that supports reference signal transmission techniques for random access messages in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to reference signal transmission techniques for random access messages, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive system information from a base station, the system information including an indication of two or more available uplink shared channel transmission occasions for a random access message transmission from the UE, select a first uplink shared channel transmission occasion of the two or more available uplink shared channel transmission occasions for transmission of a first random access message, where the first uplink shared channel transmission occasion spans at least two transmission slots, determine, based on the system information, reference signal resources within the first uplink shared channel transmission occasion for transmitting a reference signal with the first random access message, where the reference signal resources include at least one symbol in each of the two or more transmission slots, format the first random access message based on the selected first uplink shared channel transmission occasion and the identified reference signal resources, the first random access message including the reference signal and uplink shared channel data, and transmit the first random access message to the base station.

The communications manager 815 may also receive system information from a base station, the system information including an indication of two or more available random access occasions and two or more available uplink shared channel transmission occasions within each of the two or more available random access occasions, where each of the two or more available random access occasions is indicated by an associated random access occasion identifier and each of the two or more available uplink shared channel transmission occasions is indicated by an associated uplink shared channel transmission occasion identifier, select a first random access occasion of the two or more available random access occasions and a first uplink shared channel transmission occasion of the two or more available uplink shared channel transmission occasions for transmission of a first random access message, determine, based on a first random access occasion identifier associated with the first random access occasion, a first uplink shared channel transmission occasion identifier associated with the first uplink shared channel transmission occasion, or combinations thereof, a reference signal sequence for a reference signal to be transmitted with the first random access message, and transmit the first random access message to the base station. The communications manager 815 may be an example of aspects of the communications manager 1110 described herein.

Based on the actions performed by the communications manager 815 as described herein, a UE 115 may transmit a first message of a two-step RACH procedure with a reference signal in determined resources having a reference signal sequence as determined in accordance with various techniques provided herein. Such techniques may provide for enhanced reference signal transmissions that may allow for more reliable reception and decoding of random access messages, thereby enhancing system efficiency and reliability. Further, latency may also be reduced with the base station receiving and decoding payloads more reliably.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
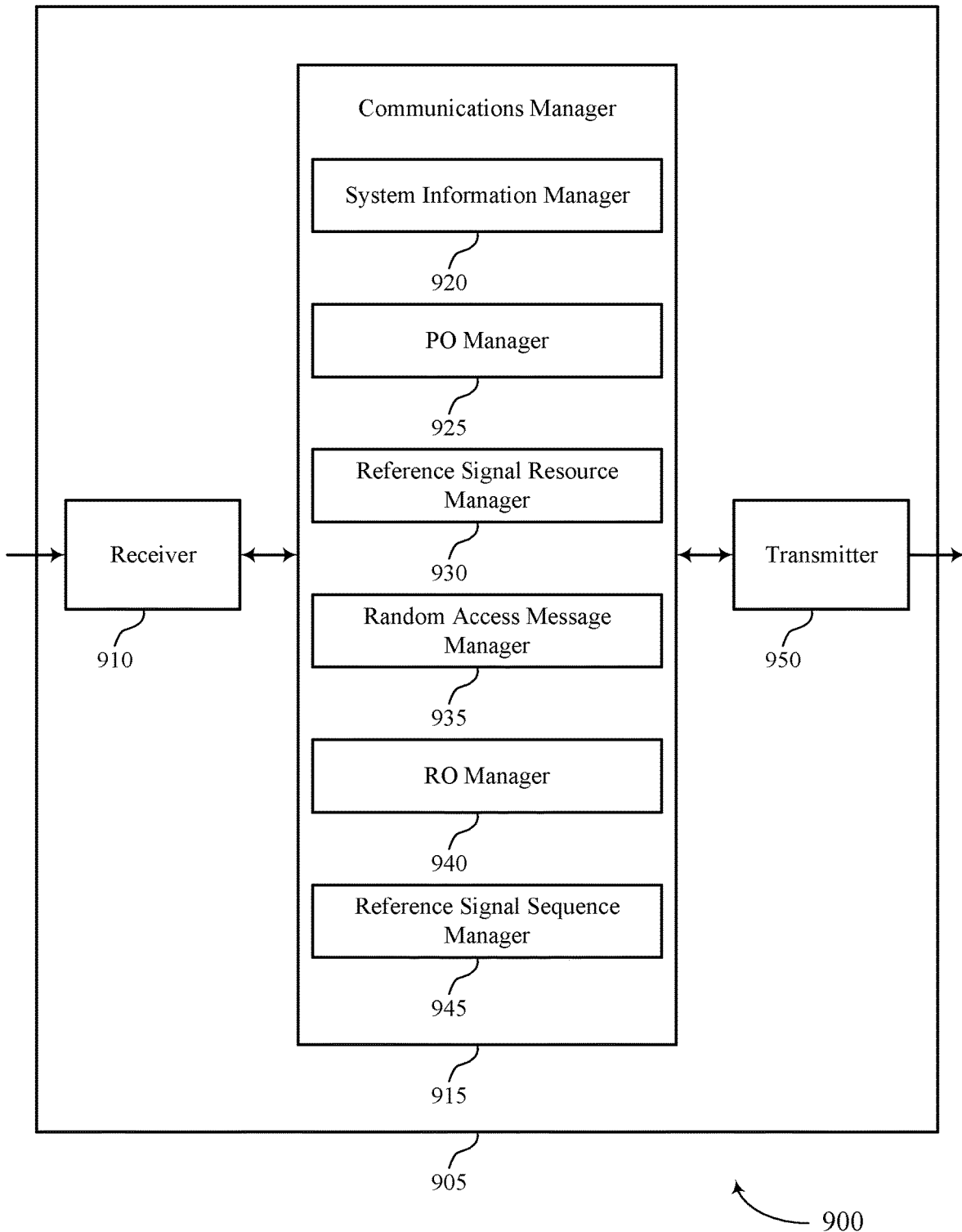

FIG. 9 shows a block diagram 900 of a device 905 that supports reference signal transmission techniques for random access messages in accordance with aspects of the present disclosure. The device 905 may be an example of aspects of a device 805, or a UE 115 as described herein. The device 905 may include a receiver 910, a communications manager 915, and a transmitter 950. The device 905 may also include a processor. Each of these components may be in communication with one another (e.g., via one or more buses).

The receiver 910 may receive information such as packets, user data, or control information associated with various information channels (e.g., control channels, data channels, and information related to reference signal transmission techniques for random access messages, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a system information manager 920, a PO manager 925, a reference signal resource manager 930, a random access message manager 935, a RO manager 940, and a reference signal sequence manager 945. The communications manager 915 may be an example of aspects of the communications manager 1110 described herein.

The system information manager 920 may receive system information from a base station, the system information including an indication of two or more available uplink shared channel transmission occasions for a random access message transmission from the UE.

The PO manager 925 may select a first uplink shared channel transmission occasion of the two or more available uplink shared channel transmission occasions for transmission of a first random access message, where the first uplink shared channel transmission occasion spans at least two transmission slots.

The reference signal resource manager 930 may determine, based on the system information, reference signal resources within the first uplink shared channel transmission occasion for transmitting a reference signal with the first random access message, where the reference signal resources include at least one symbol in each of the two or more transmission slots.

The random access message manager 935 may format the first random access message based on the selected first uplink shared channel transmission occasion and the determined reference signal resources, the first random access message including the reference signal and uplink shared channel data and transmit the first random access message to the base station.

In some cases, the system information manager 920 may receive system information from a base station, the system information including an indication of two or more available random access occasions and two or more available uplink shared channel transmission occasions within each of the two or more available random access occasions, where each of the two or more available random access occasions is indicated by an associated random access occasion identifier and each of the two or more available uplink shared channel transmission occasions is indicated by an associated uplink shared channel transmission occasion identifier. The RO manager 940 may select a first random access occasion of the two or more available random access occasions and a first uplink shared channel transmission occasion of the two or more available uplink shared channel transmission occasions for transmission of a first random access message. The reference signal sequence manager 945 may determine, based on a first random access occasion identifier associated with the first random access occasion, a first uplink shared channel transmission occasion identifier associated with the first uplink shared channel transmission occasion, or combinations thereof, a reference signal sequence for a reference signal to be transmitted with the first random access message. The random access message manager 935 may transmit the first random access message to the base station.

Based on receiving the system information, a processor of a UE 115 (e.g., controlling the receiver 910, the transmitter 950, or a transceiver 1120 as described with reference to FIG. 11) may efficiently prepare a preamble and payload of a first message of a two-step RACH procedure prior to transmitting each of the preamble and the payload. For example, the processor of the UE 115 may determine when corresponding RACH occasions and PUSCH occasions are forthcoming for transmitting the preamble and the payload, respectively, and transmit the corresponding transmissions with reference signals to aid in reception and demodulation of the random access messages in an efficient and reliable manner.

The transmitter 950 may transmit signals generated by other components of the device 905. In some examples, the transmitter 950 may be collocated with a receiver 910 in a transceiver module. For example, the transmitter 950 may be an example of aspects of the transceiver 1120 described with reference to FIG. 11. The transmitter 950 may utilize a single antenna or a set of antennas.

Figure 10:
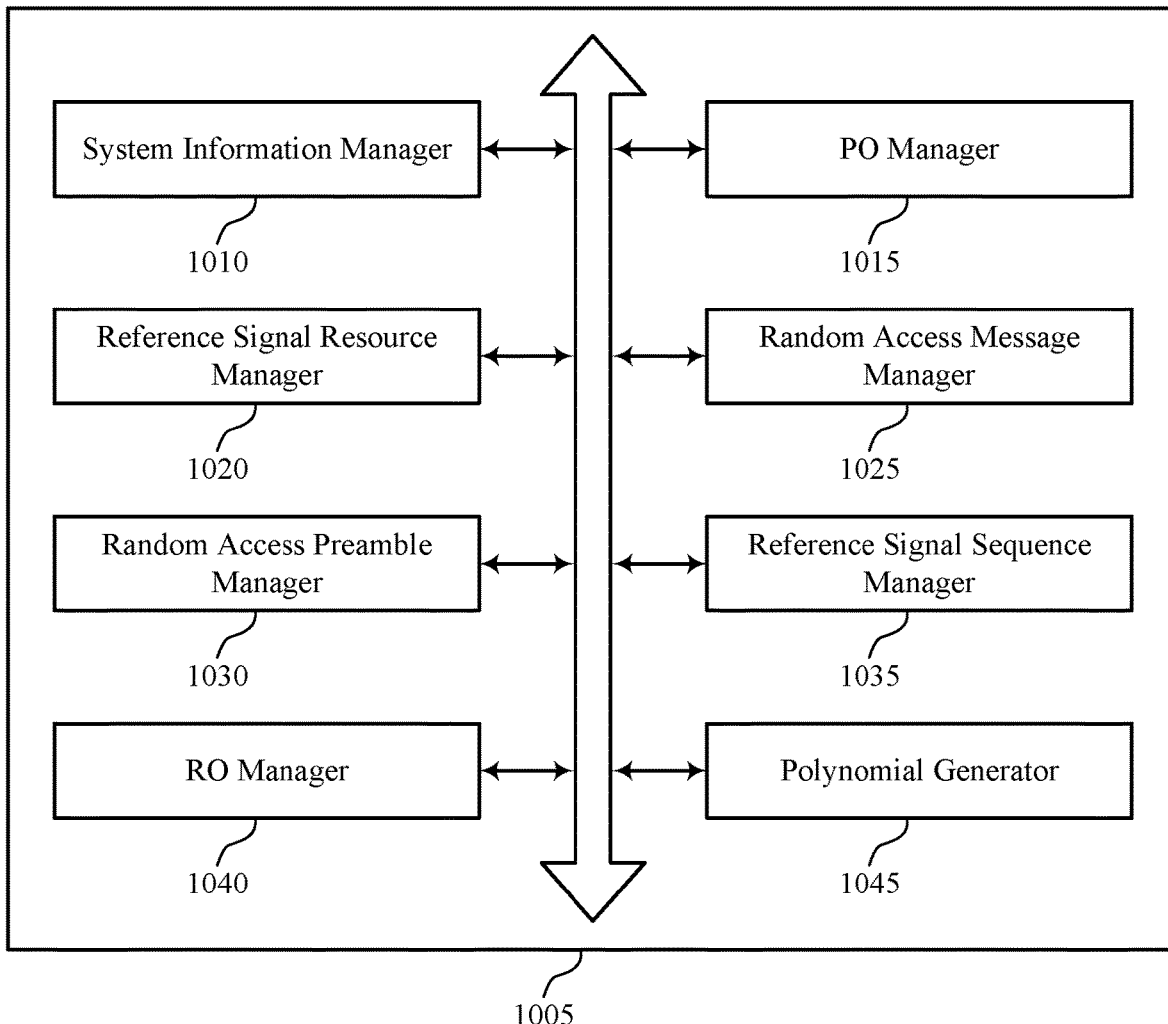
FIG. 10 shows a block diagram of a communications manager that supports reference signal transmission techniques for random access messages in accordance with aspects of the present disclosure.

FIG. 10 shows a block diagram 1000 of a communications manager 1005 that supports reference signal transmission techniques for random access messages in accordance with aspects of the present disclosure. The communications manager 1005 may be an example of aspects of a communications manager 815, a communications manager 915, or a communications manager 1110 described herein. The communications manager 1005 may include a system information manager 1010, a PO manager 1015, a reference signal resource manager 1020, a random access message manager 1025, a random access preamble manager 1030, a reference signal sequence manager 1035, a RO manager 1040, and a polynomial generator 1045. Each of these modules may communicate, directly or indirectly, with one another (e.g., via one or more buses).

The system information manager 1010 may receive system information from a base station, the system information including an indication of two or more available uplink shared channel transmission occasions for a random access message transmission from the UE.

In some examples, the system information manager 1010 may receive system information from a base station, the system information including an indication of two or more available random access occasions and two or more available uplink shared channel transmission occasions within each of the two or more available random access occasions, where each of the two or more available random access occasions is indicated by an associated random access occasion identifier and each of the two or more available uplink shared channel transmission occasions is indicated by an associated uplink shared channel transmission occasion identifier.

The PO manager 1015 may select a first uplink shared channel transmission occasion of the two or more available uplink shared channel transmission occasions for transmission of a first random access message, where the first uplink shared channel transmission occasion spans at least two transmission slots.

The reference signal resource manager 1020 may determine, based on the system information, reference signal resources within the first uplink shared channel transmission occasion for transmitting a reference signal with the first random access message, where the reference signal resources include at least one symbol in each of the two or more transmission slots. In some cases, the reference signal is a demodulation reference signal, and where the reference signal resources in each of the two or more transmission slots are front-loaded in each of the at least two transmission slots, are distributed in each of the at least two transmission slots, or combinations thereof.

The random access message manager 1025 may format the first random access message based on the selected first uplink shared channel transmission occasion and the determined reference signal resources, the first random access message including the reference signal and uplink shared channel data. In some examples, the random access message manager 1025 may transmit the first random access message to the base station.

The reference signal sequence manager 1035 may determine, based on a first random access occasion identifier associated with the first random access occasion, a first uplink shared channel transmission occasion identifier associated with the first uplink shared channel transmission occasion, or combinations thereof, a reference signal sequence for a reference signal to be transmitted with the first random access message. In some examples, the reference signal sequence manager 1035 may determine a reference signal sequence for the reference signal based on the random access preamble.

In some examples, the reference signal sequence manager 1035 may apply a cover code to the reference signal that is associated with the UE. In some examples, the reference signal sequence manager 1035 may determine the cover code based on a codebook indicated by the system information, and where the cover code spans all of the reference signal resources in each of the two or more transmission slots. In some examples, the reference signal sequence manager 1035 may determine separate cover codes associated with each of the two or more transmission slots based on different codebooks associated with each of the two or more transmission slots. In some cases, the cover code is a binary orthogonal cover code, a non-binary orthogonal cover code, or a quasi-orthogonal cover code. In some cases, the different codebooks are each associated with different subsets of the two or more available uplink shared channel transmission occasions. In some cases, the cover code is applied separately or jointly across frequency domain resources associated with the two or more available uplink shared channel transmission occasions.

In some examples, the reference signal sequence manager 1035 may determine an initialization seed for a polynomial generator that generates the reference signal sequence, the initialization seed based on one or more of the first uplink shared channel transmission occasion identifier, the first random access occasion identifier, a preamble sequence identifier provided in the system information, or any combinations thereof. In some examples, the reference signal sequence manager 1035 may determine a base sequence based on one or more of a group index, a sequence index, a cyclic shift, or any combinations thereof, indicated in the system information. In some cases, the initialization seed is further based on one or more of a symbol index of a symbol within a transmission slot that carries the reference signal, a transmission slot number of the transmission slot within a radio frame, a sub-carrier spacing used for transmitting the first random access message, one or more scaling constants, or any combinations thereof. In some cases, the reference signal sequence is a preconfigured gold sequence that is selected from a set of available preconfigured gold sequences based on the first random access occasion identifier and the first uplink shared channel transmission occasion identifier.

In some cases, the reference signal sequence includes a cyclic prefix orthogonal frequency division multiplexing (CP-OFDM) waveform demodulation reference signal (DMRS) sequence.

In some cases, the group index is determined based on one or more of the first uplink shared channel transmission occasion identifier, the first random access occasion identifier, a preamble sequence identifier provided in the system information, or any combinations thereof. In some cases, the group index is further determined based on a group hopping index provided in the system information, a reference signal sequence hopping index provided in the system information, or any combinations thereof.

In some cases, the reference signal sequence includes a discrete Fourier transform spread orthogonal frequency division multiplexing (DFT-s-OFDM) waveform demodulation reference signal (DMRS) sequence. In some cases, the base sequence is selected from a set of available base sequences including Zadoff-Chu sequences, computer generated sequences, modified chirp sequences, composite sequences with low peak to average power ratios, or any combinations thereof.

The RO manager 1040 may select a first random access occasion of the two or more available random access occasions and a first uplink shared channel transmission occasion of the two or more available uplink shared channel transmission occasions for transmission of a first random access message. The random access preamble manager 1030 may determine a random access preamble for transmission with the first random access message.

In some examples, the communications manager 1005 may be included in a UE that is in RRC connected state. In such examples, the system information manager 1010 may receive the system information via RRC signaling. In other examples, system information manager 1010 may receive the system information via physical layer signaling (e.g., in a SIB message).

In some examples, the two or more available random access occasions and two or more available uplink shared channel transmission occasions are associated with an RRC state. In such examples, the RO manager 1040 may select the first random access occasion and the first uplink shared channel transmission occasion based on the UE being in the RRC state.

The polynomial generator 1045 may generate a polynomial for the reference signal sequence. In some cases, the polynomial generator is a closed-form polynomial generator that generates a pseudo-random noise (PN) sequence or other DMRS sequence.

Figure 11:
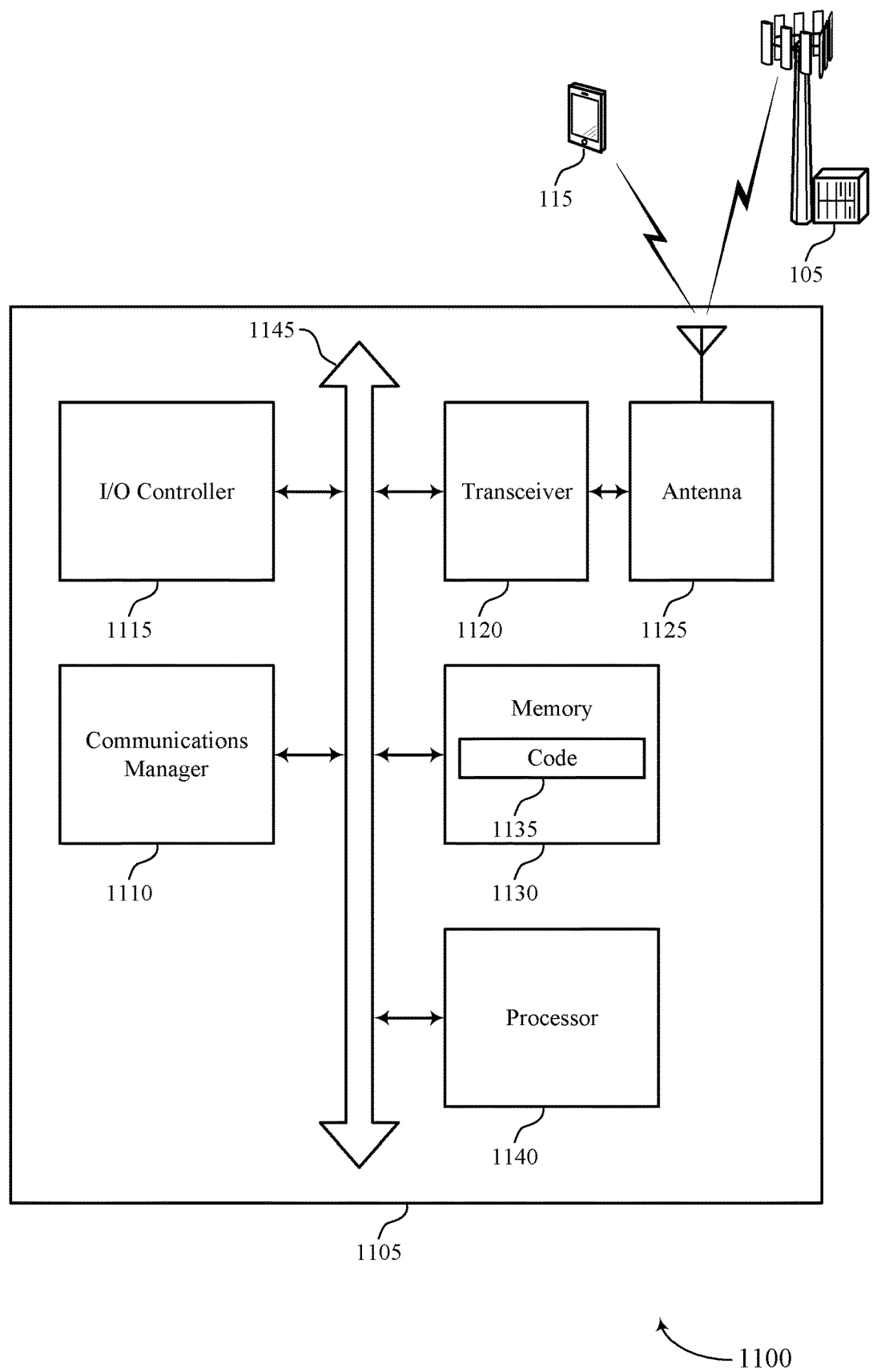
FIG. 11 shows a diagram of a system including a device that supports reference signal transmission techniques for random access messages in accordance with aspects of the present disclosure.

FIG. 11 shows a diagram of a system 1100 including a device 1105 that supports reference signal transmission techniques for random access messages in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive system information from a base station, the system information including an indication of two or more available uplink shared channel transmission occasions for a random access message transmission from the UE, select a first uplink shared channel transmission occasion of the two or more available uplink shared channel transmission occasions for transmission of a first random access message, where the first uplink shared channel transmission occasion spans at least two transmission slots, determine, based on the system information, reference signal resources within the first uplink shared channel transmission occasion for transmitting a reference signal with the first random access message, where the reference signal resources include at least one symbol in each of the two or more transmission slots, format the first random access message based on the selected first uplink shared channel transmission occasion and the determined reference signal resources, the first random access message including the reference signal and uplink shared channel data, and transmit the first random access message to the base station.

The communications manager 1110 may also receive system information from a base station, the system information including an indication of two or more available random access occasions and two or more available uplink shared channel transmission occasions within each of the two or more available random access occasions, where each of the two or more available random access occasions is indicated by an associated random access occasion identifier and each of the two or more available uplink shared channel transmission occasions is indicated by an associated uplink shared channel transmission occasion identifier, select a first random access occasion of the two or more available random access occasions and a first uplink shared channel transmission occasion of the two or more available uplink shared channel transmission occasions for transmission of a first random access message, determine, based on a first random access occasion identifier associated with the first random access occasion, a first uplink shared channel transmission occasion identifier associated with the first uplink shared channel transmission occasion, or combinations thereof, a reference signal sequence for a reference signal to be transmitted with the first random access message, and transmit the first random access message to the base station.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting reference signal transmission techniques for random access messages).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
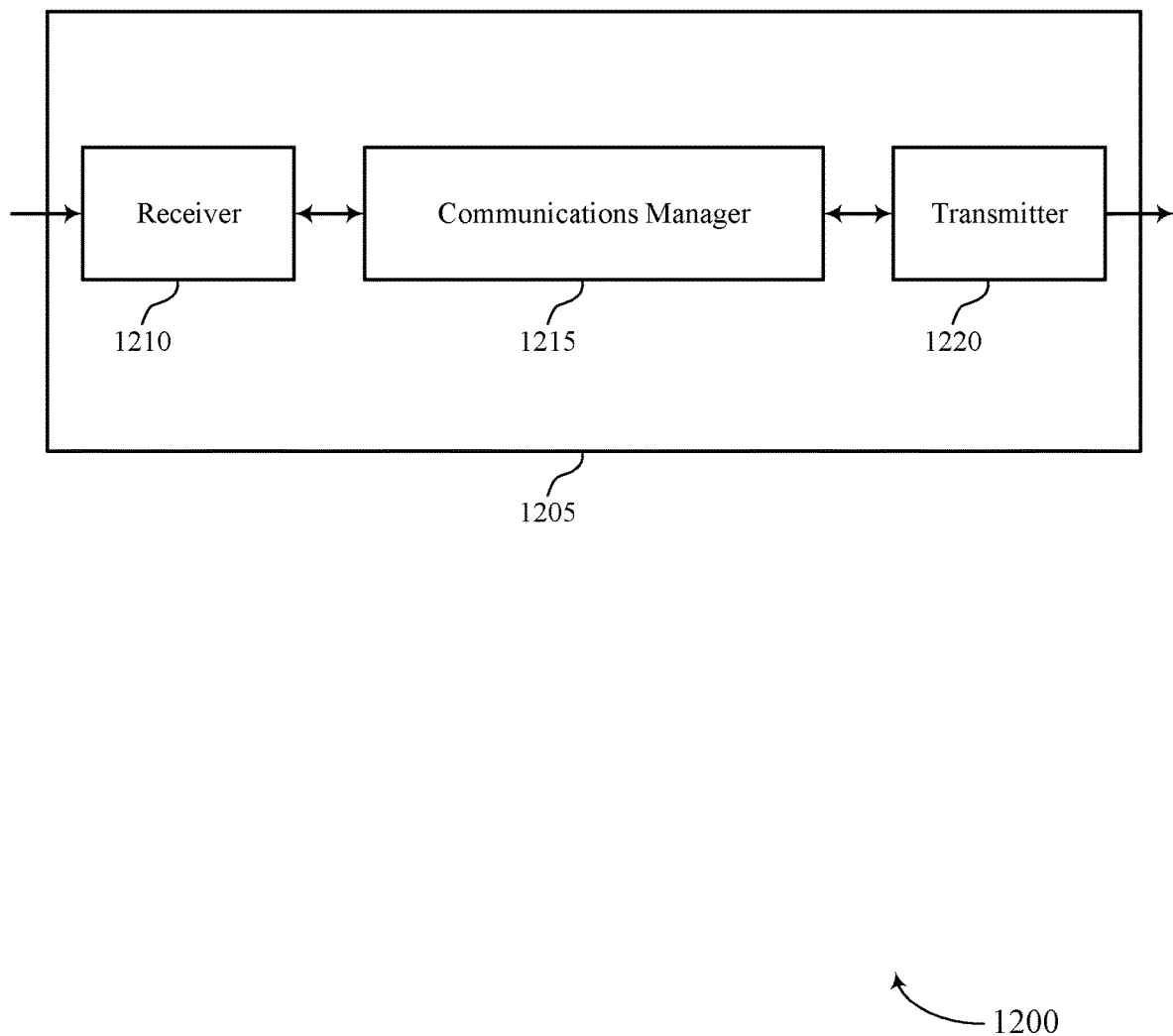
FIGS. 12 and 13 show block diagrams of devices that support reference signal transmission techniques for random access messages in accordance with aspects of the present disclosure.

FIG. 12 shows a block diagram 1200 of a device 1205 that supports reference signal transmission techniques for random access messages in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to reference signal transmission techniques for random access messages, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may determine two or more uplink shared channel transmission occasions for a random access message transmission from at least a first UE of a set of UEs served by the base station, where at least a first uplink shared channel transmission occasion of the two or more uplink shared channel transmission occasions spans two or more transmission slots, configure reference signal resources for each of the two or more uplink shared channel transmission occasions, where the reference signal resources for the first uplink shared channel transmission occasion include at least one symbol in each of the two or more transmission slots, transmit system information to the set of UEs that indicates the two or more uplink shared channel transmission occasions, and the configured reference signal resources, that are available for random access message transmissions of the set of UEs, and receive a first random access message from the first UE based on a reference signal transmitted in the reference signal resources associated with the uplink shared channel transmission occasion selected by the first UE for transmission of the first random access message.

The communications manager 1215 may also configure two or more random access occasions and two or more uplink shared channel transmission occasions within each of the two or more random access occasions that are available for at least a first UE to transmit a first random access message, where each of the two or more random access occasions has an associated random access occasion identifier and each of the two or more uplink shared channel transmission occasions has an associated uplink shared channel transmission occasion identifier, transmit system information to a set of UEs, the system information including random access occasion identifiers of the configured two or more random access occasions and uplink shared channel transmission occasion identifiers of the configured two or more uplink shared channel transmission occasions, receive the first random access message from the first UE in a first uplink shared channel transmission occasion of a first random access occasions, where the first random access message includes a reference signal, demodulate the first random access message based on the determined reference signal sequence, and determine, based on a first random access occasion identifier associated with the first random access occasion and a first uplink shared channel transmission occasion identifier associated with the first uplink shared channel transmission occasion, a reference signal sequence for the reference signal transmitted with the first random access message. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
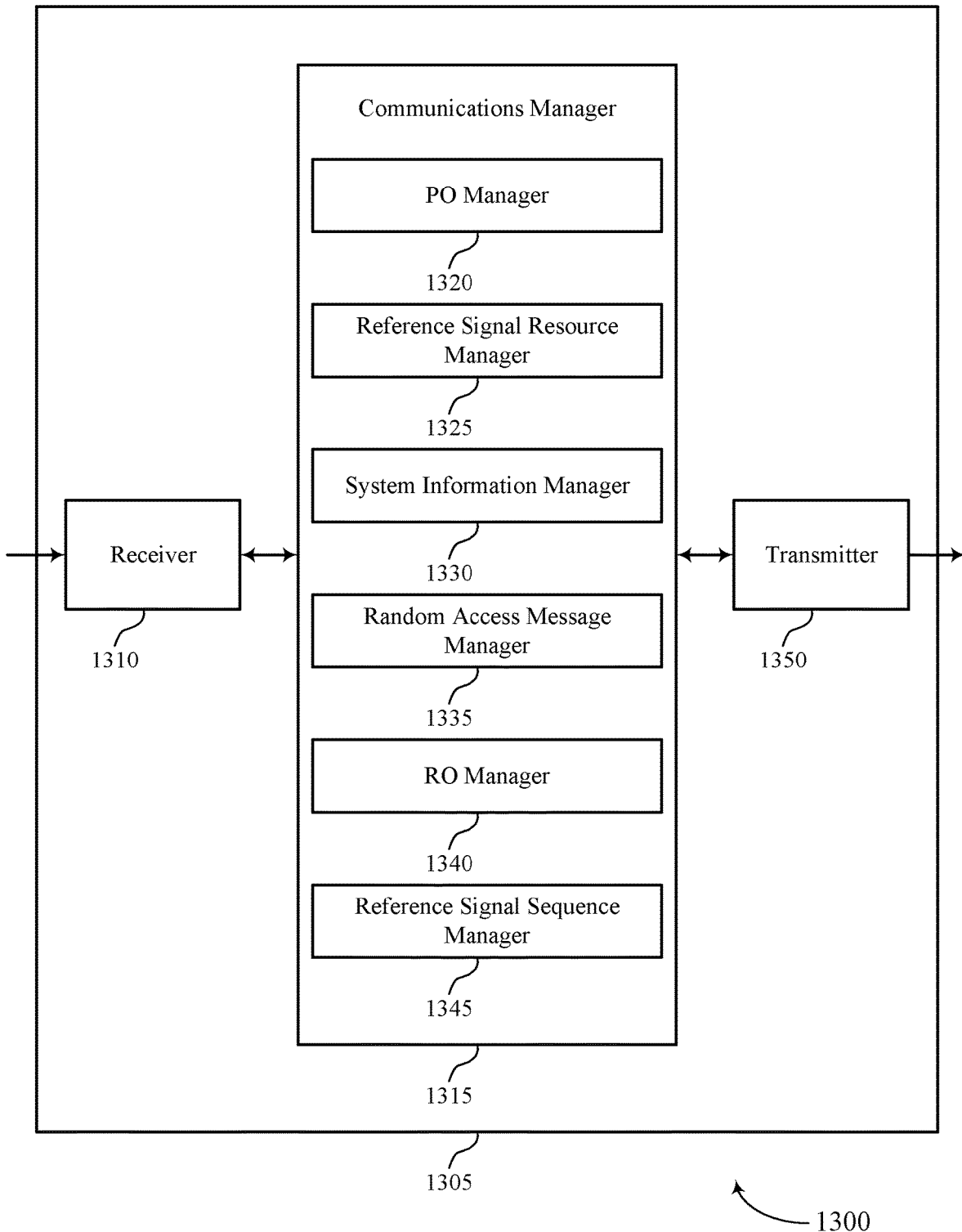

FIG. 13 shows a block diagram 1300 of a device 1305 that supports reference signal transmission techniques for random access messages in accordance with aspects of the present disclosure. The device 1305 may be an example of aspects of a device 1205, or a base station 105 as described herein. The device 1305 may include a receiver 1310, a communications manager 1315, and a transmitter 1350. The device 1305 may also include a processor. Each of these components may be in communication with one another (e.g., via one or more buses).

The receiver 1310 may receive information such as packets, user data, or control information associated with various information channels (e.g., control channels, data channels, and information related to reference signal transmission techniques for random access messages, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a PO manager 1320, a reference signal resource manager 1325, a system information manager 1330, a random access message manager 1335, a RO manager 1340, and a reference signal sequence manager 1345. The communications manager 1315 may be an example of aspects of the communications manager 1510 described herein.

The PO manager 1320 may determine two or more uplink shared channel transmission occasions for a random access message transmission from at least a first UE of a set of UEs served by the base station, where at least a first uplink shared channel transmission occasion of the two or more uplink shared channel transmission occasions spans two or more transmission slots.

The reference signal resource manager 1325 may configure reference signal resources for each of the two or more uplink shared channel transmission occasions, where the reference signal resources for the first uplink shared channel transmission occasion include at least one symbol in each of the two or more transmission slots.

The system information manager 1330 may transmit system information to the set of UEs that indicates the two or more uplink shared channel transmission occasions, and the configured reference signal resources, that are available for random access message transmissions of the set of UEs.

The random access message manager 1335 may receive a first random access message from the first UE based on a reference signal transmitted in the reference signal resources associated with the uplink shared channel transmission occasion selected by the first UE for transmission of the first random access message.

The RO manager 1340 may configure two or more random access occasions and two or more uplink shared channel transmission occasions within each of the two or more random access occasions that are available for at least a first UE to transmit a first random access message, where each of the two or more random access occasions has an associated random access occasion identifier and each of the two or more uplink shared channel transmission occasions has an associated uplink shared channel transmission occasion identifier.

In some cases, the reference signal resource manager 1325 may transmit system information to a set of UEs, the system information including random access occasion identifiers of the configured two or more random access occasions and uplink shared channel transmission occasion identifiers of the configured two or more uplink shared channel transmission occasions. The random access message manager 1335 may receive the first random access message from the first UE in a first uplink shared channel transmission occasion of a first random access occasions, where the first random access message includes a reference signal and demodulate the first random access message based on the determined reference signal sequence. The reference signal sequence manager 1345 may determine, based on a first random access occasion identifier associated with the first random access occasion and a first uplink shared channel transmission occasion identifier associated with the first uplink shared channel transmission occasion, a reference signal sequence for the reference signal transmitted with the first random access message.

The transmitter 1350 may transmit signals generated by other components of the device 1305. In some examples, the transmitter 1350 may be collocated with a receiver 1310 in a transceiver module. For example, the transmitter 1350 may be an example of aspects of the transceiver 1520 described with reference to FIG. 15. The transmitter 1350 may utilize a single antenna or a set of antennas.

Figure 14:
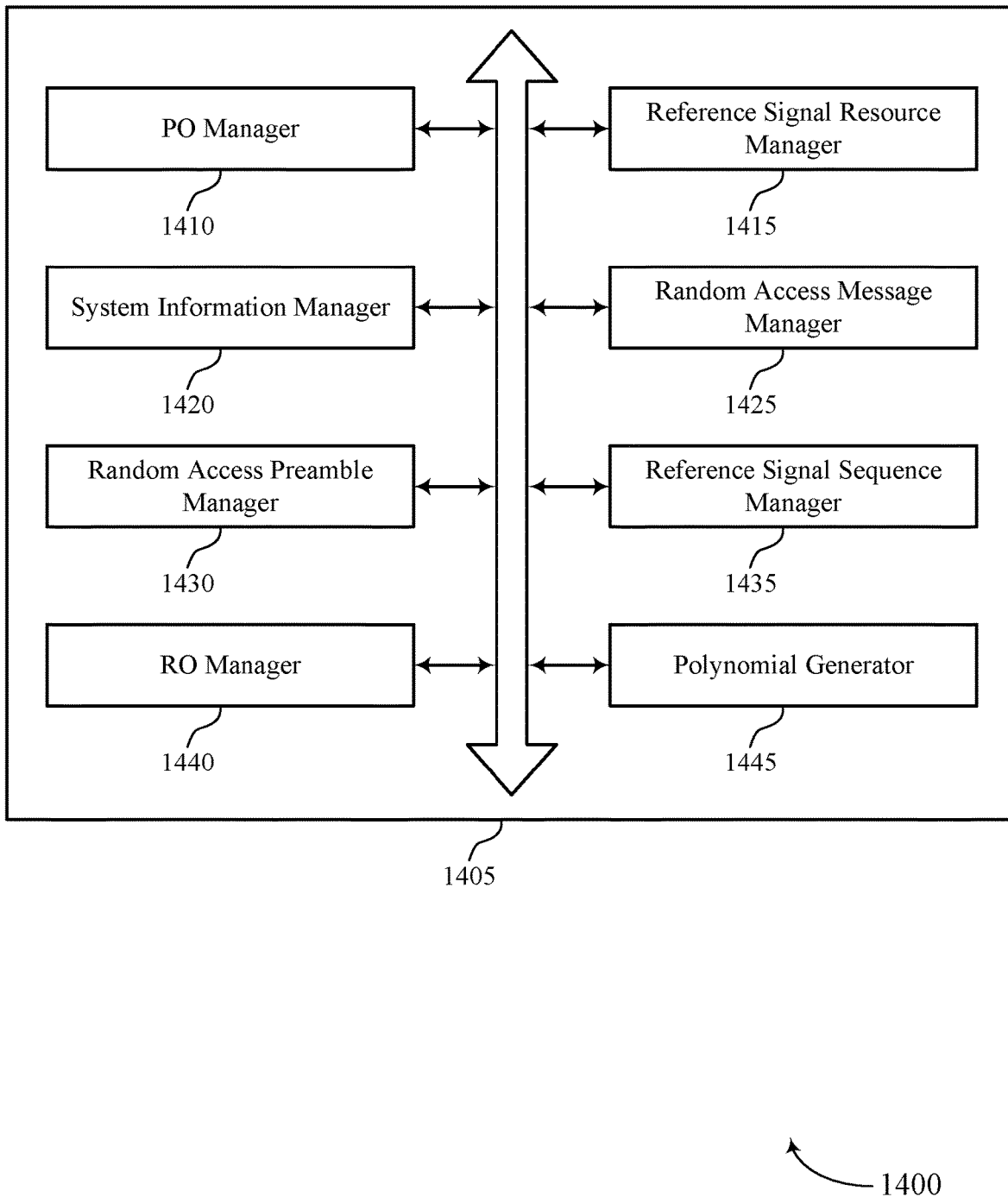
FIG. 14 shows a block diagram of a communications manager that supports reference signal transmission techniques for random access messages in accordance with aspects of the present disclosure.

FIG. 14 shows a block diagram 1400 of a communications manager 1405 that supports reference signal transmission techniques for random access messages in accordance with aspects of the present disclosure. The communications manager 1405 may be an example of aspects of a communications manager 1215, a communications manager 1315, or a communications manager 1510 described herein. The communications manager 1405 may include a PO manager 1410, a reference signal resource manager 1415, a system information manager 1420, a random access message manager 1425, a random access preamble manager 1430, a reference signal sequence manager 1435, a RO manager 1440, and a polynomial generator 1445. Each of these modules may communicate, directly or indirectly, with one another (e.g., via one or more buses).

The PO manager 1410 may determine two or more uplink shared channel transmission occasions for a random access message transmission from at least a first UE of a set of UEs served by the base station, where at least a first uplink shared channel transmission occasion of the two or more uplink shared channel transmission occasions spans two or more transmission slots. In some examples, the PO manager 1410 may determine the two or more shared uplink channel transmission occasions for a RRC state.

The reference signal resource manager 1415 may configure reference signal resources for each of the two or more uplink shared channel transmission occasions, where the reference signal resources for the first uplink shared channel transmission occasion include at least one symbol in each of the two or more transmission slots.

In some examples, the reference signal resource manager 1415 may transmit system information to a set of UEs, the system information including random access occasion identifiers of the configured two or more random access occasions and uplink shared channel transmission occasion identifiers of the configured two or more uplink shared channel transmission occasions. In some cases, the reference signal is a demodulation reference signal, and where the reference signal resources in each of the two or more transmission slots are front-loaded in each of the at least two transmission slots, are distributed in each of the at least two transmission slots, or combinations thereof. In some examples, the reference signal resource manager 1415 may transmit the system information in a SIB, in an RRC message, or both.

The system information manager 1420 may transmit system information to the set of UEs that indicates the two or more uplink shared channel transmission occasions, and the configured reference signal resources, that are available for random access message transmissions of the set of UEs.

In some examples, the system information manager 1420 may configure an indication of two or more cover code codebooks in the system information, and where at least a first cover code of a first cover code codebook spans all of the reference signal resources in each of the two or more transmission slots of the first uplink shared channel transmission occasion. In some examples, the system information manager 1420 may configure different cover code codebooks for each of the two or more transmission slots of the first uplink shared channel transmission occasion.

The random access message manager 1425 may receive a first random access message from the first UE based on a reference signal transmitted in the reference signal resources associated with the uplink shared channel transmission occasion selected by the first UE for transmission of the first random access message.

In some examples, the random access message manager 1425 may receive the first random access message from the first UE in a first uplink shared channel transmission occasion of a first random access occasions, where the first random access message includes a reference signal. In some examples, the random access message manager 1425 may demodulate the first random access message based on the determined reference signal sequence.

In some examples, the random access message manager 1425 may demodulate and decode a payload of the first random access message based on the random access preamble and the reference signal sequence.

The reference signal sequence manager 1435 may determine, based on a first random access occasion identifier associated with the first random access occasion and a first uplink shared channel transmission occasion identifier associated with the first uplink shared channel transmission occasion, a reference signal sequence for the reference signal transmitted with the first random access message. In some examples, the reference signal sequence manager 1435 may determine a reference signal sequence of the reference signal of the first random access message based on the random access preamble of the first random access message.

In some examples, the reference signal sequence manager 1435 may decode the first random access message based on a cover code applied to the reference signal that is associated with the first UE. In some cases, the cover code is a binary orthogonal cover code, a non-binary orthogonal cover code, or a quasi-orthogonal cover code. In some cases, the different cover code codebooks are each associated with different subsets of the two or more uplink shared channel transmission occasions. In some cases, the cover codes are applied separately or jointly across frequency domain resources associated with the two or more uplink shared channel transmission occasions.

In some examples, the reference signal sequence manager 1435 may determine an initialization seed for a polynomial generator that generates the reference signal sequence, the initialization seed based on one or more of the first uplink shared channel transmission occasion identifier, the first random access occasion identifier, a preamble sequence identifier provided in the system information, or any combinations thereof. In some examples, the reference signal sequence manager 1435 may determine a base sequence based on one or more of a group index, a sequence index, a cyclic shift, or any combinations thereof, indicated in the system information. In some cases, the initialization seed is further based on one or more of a symbol index of a symbol within a transmission slot that carries the reference signal, a transmission slot number of the transmission slot within a radio frame, a sub-carrier spacing used for transmitting the first random access message, one or more scaling constants, or any combinations thereof. In some cases, the reference signal sequence is a preconfigured gold sequence that is selected from a set of available preconfigured gold sequences based on the first random access occasion identifier and the first uplink shared channel transmission occasion identifier.

In some cases, the reference signal sequence includes a cyclic prefix orthogonal frequency division multiplexing (CP-OFDM) waveform demodulation reference signal (DMRS) sequence.

In some cases, the group index is determined based on one or more of the first uplink shared channel transmission occasion identifier, the first random access occasion identifier, a preamble sequence identifier provided in the system information, or any combinations thereof. In some cases, the group index is further determined based on a group hopping index provided in the system information, a reference signal sequence hopping index provided in the system information, or any combinations thereof.

In some cases, the reference signal sequence includes a discrete Fourier transform spread orthogonal frequency division multiplexing (DFT-s-OFDM) waveform demodulation reference signal (DMRS) sequence. In some cases, the base sequence is selected from a set of available base sequences including Zadoff-Chu sequences, computer generated sequences, modified chirp sequences, composite sequences with low peak to average power ratios, or any combinations thereof.

The RO manager 1440 may configure two or more random access occasions and two or more uplink shared channel transmission occasions within each of the two or more random access occasions that are available for at least a first UE to transmit a first random access message, where each of the two or more random access occasions has an associated random access occasion identifier and each of the two or more uplink shared channel transmission occasions has an associated uplink shared channel transmission occasion identifier.

The random access preamble manager 1430 may determine a random access preamble of the first random access message.

The polynomial generator 1445 may generate a polynomial that is used to determine a DMRS sequence. In some cases, the polynomial generator is a closed-form polynomial generator that generates a pseudo-random noise (PN) sequence.

Figure 15:
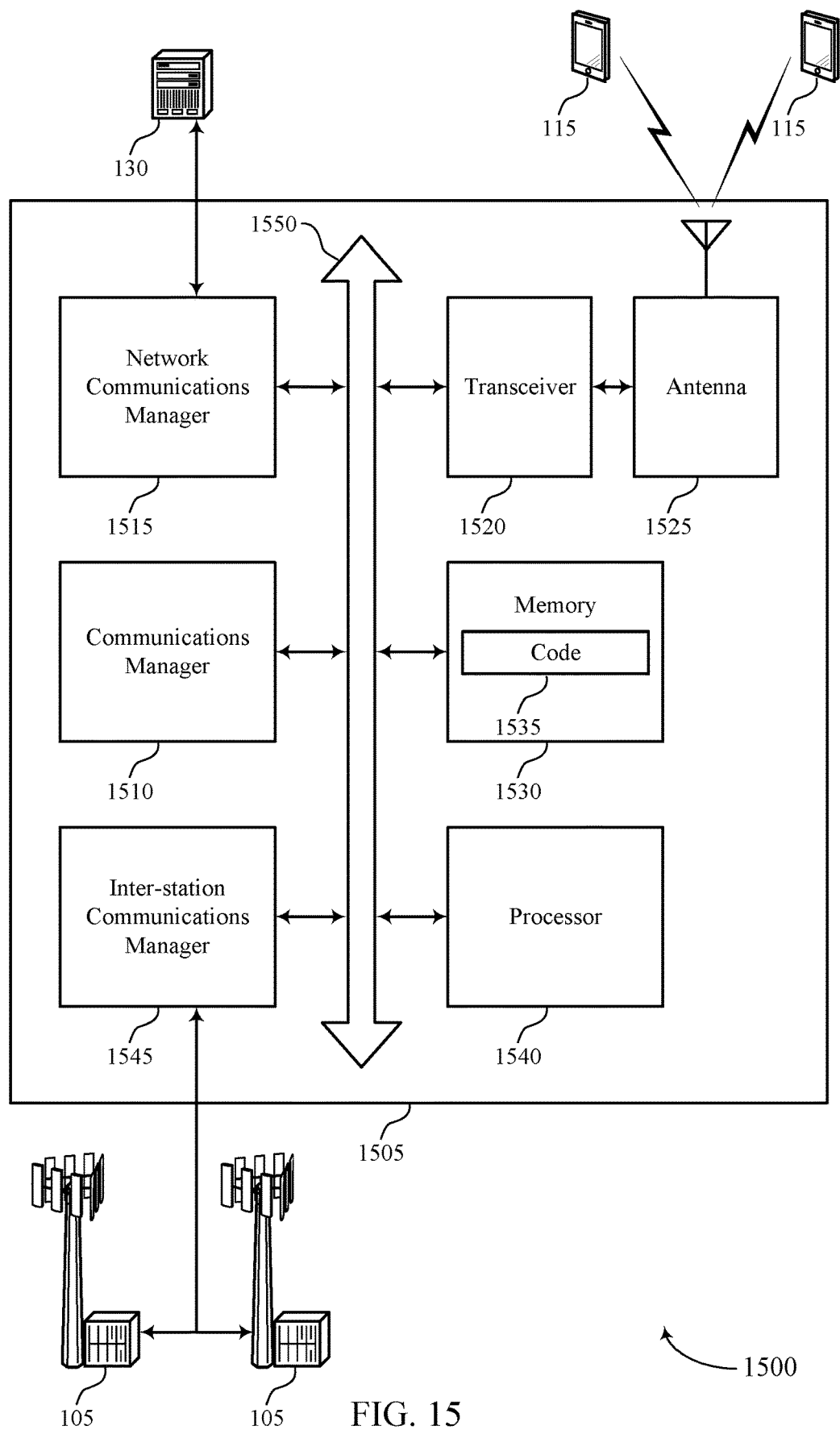
FIG. 15 shows a diagram of a system including a device that supports reference signal transmission techniques for random access messages in accordance with aspects of the present disclosure.

FIG. 15 shows a diagram of a system 1500 including a device 1505 that supports reference signal transmission techniques for random access messages in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may determine two or more uplink shared channel transmission occasions for a random access message transmission from at least a first UE of a set of UEs served by the base station, where at least a first uplink shared channel transmission occasion of the two or more uplink shared channel transmission occasions spans two or more transmission slots, configure reference signal resources for each of the two or more uplink shared channel transmission occasions, where the reference signal resources for the first uplink shared channel transmission occasion include at least one symbol in each of the two or more transmission slots, transmit system information to the set of UEs that indicates the two or more uplink shared channel transmission occasions, and the configured reference signal resources, that are available for random access message transmissions of the set of UEs, and receive a first random access message from the first UE based on a reference signal transmitted in the reference signal resources associated with the uplink shared channel transmission occasion selected by the first UE for transmission of the first random access message.

The communications manager 1510 may also configure two or more random access occasions and two or more uplink shared channel transmission occasions within each of the two or more random access occasions that are available for at least a first UE to transmit a first random access message, where each of the two or more random access occasions has an associated random access occasion identifier and each of the two or more uplink shared channel transmission occasions has an associated uplink shared channel transmission occasion identifier, transmit system information to a set of UEs, the system information including random access occasion identifiers of the configured two or more random access occasions and uplink shared channel transmission occasion identifiers of the configured two or more uplink shared channel transmission occasions, receive the first random access message from the first UE in a first uplink shared channel transmission occasion of a first random access occasions, where the first random access message includes a reference signal, demodulate the first random access message based on the determined reference signal sequence, and determine, based on a first random access occasion identifier associated with the first random access occasion and a first uplink shared channel transmission occasion identifier associated with the first uplink shared channel transmission occasion, a reference signal sequence for the reference signal transmitted with the first random access message.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting reference signal transmission techniques for random access messages).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
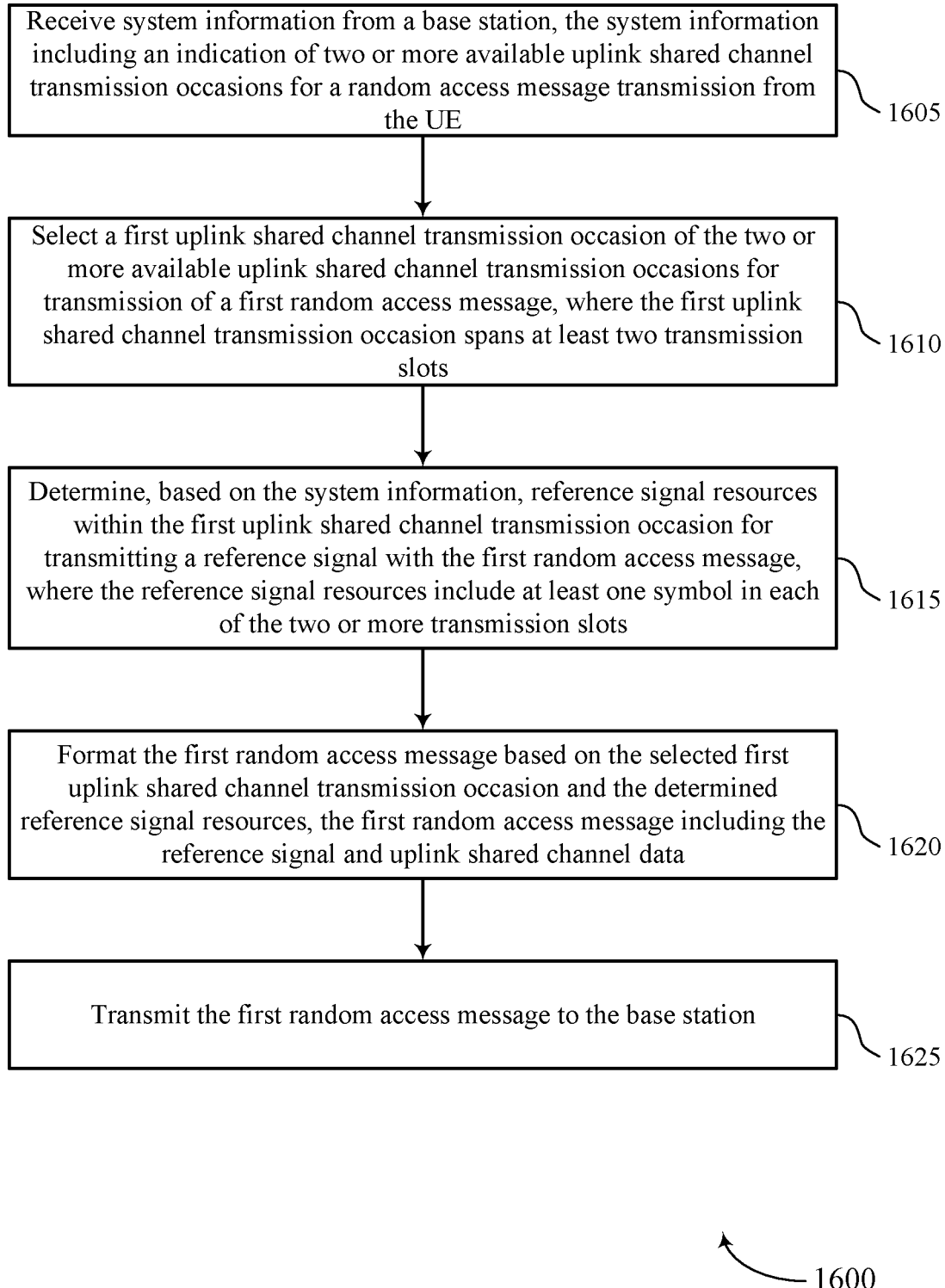
FIGS. 16 through 21 show flowcharts illustrating methods that support reference signal transmission techniques for random access messages in accordance with aspects of the present disclosure.

FIG. 16 shows a flowchart illustrating a method 1600 that supports reference signal transmission techniques for random access messages in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive system information from a base station, the system information including an indication of two or more available uplink shared channel transmission occasions for a random access message transmission from the UE. The operations of 1605 may be performed according to the methods described herein. In some examples, aspects of the operations of 1605 may be performed by a system information manager as described with reference to FIGS. 8 through 11.

At 1610, the UE may select a first uplink shared channel transmission occasion of the two or more available uplink shared channel transmission occasions for transmission of a first random access message, where the first uplink shared channel transmission occasion spans at least two transmission slots. The operations of 1610 may be performed according to the methods described herein. In some examples, aspects of the operations of 1610 may be performed by a PO manager as described with reference to FIGS. 8 through 11.

At 1615, the UE may determine, based on the system information, reference signal resources within the first uplink shared channel transmission occasion for transmitting a reference signal with the first random access message, where the reference signal resources include at least one symbol in each of the two or more transmission slots. The operations of 1615 may be performed according to the methods described herein. In some examples, aspects of the operations of 1615 may be performed by a reference signal resource manager as described with reference to FIGS. 8 through 11.

At 1620, the UE may format the first random access message based on the selected first uplink shared channel transmission occasion and the determined reference signal resources, the first random access message including the reference signal and uplink shared channel data. The operations of 1620 may be performed according to the methods described herein. In some examples, aspects of the operations of 1620 may be performed by a random access message manager as described with reference to FIGS. 8 through 11.

At 1625, the UE may transmit the first random access message to the base station. The operations of 1625 may be performed according to the methods described herein. In some examples, aspects of the operations of 1625 may be performed by a random access message manager as described with reference to FIGS. 8 through 11.

Figure 17:
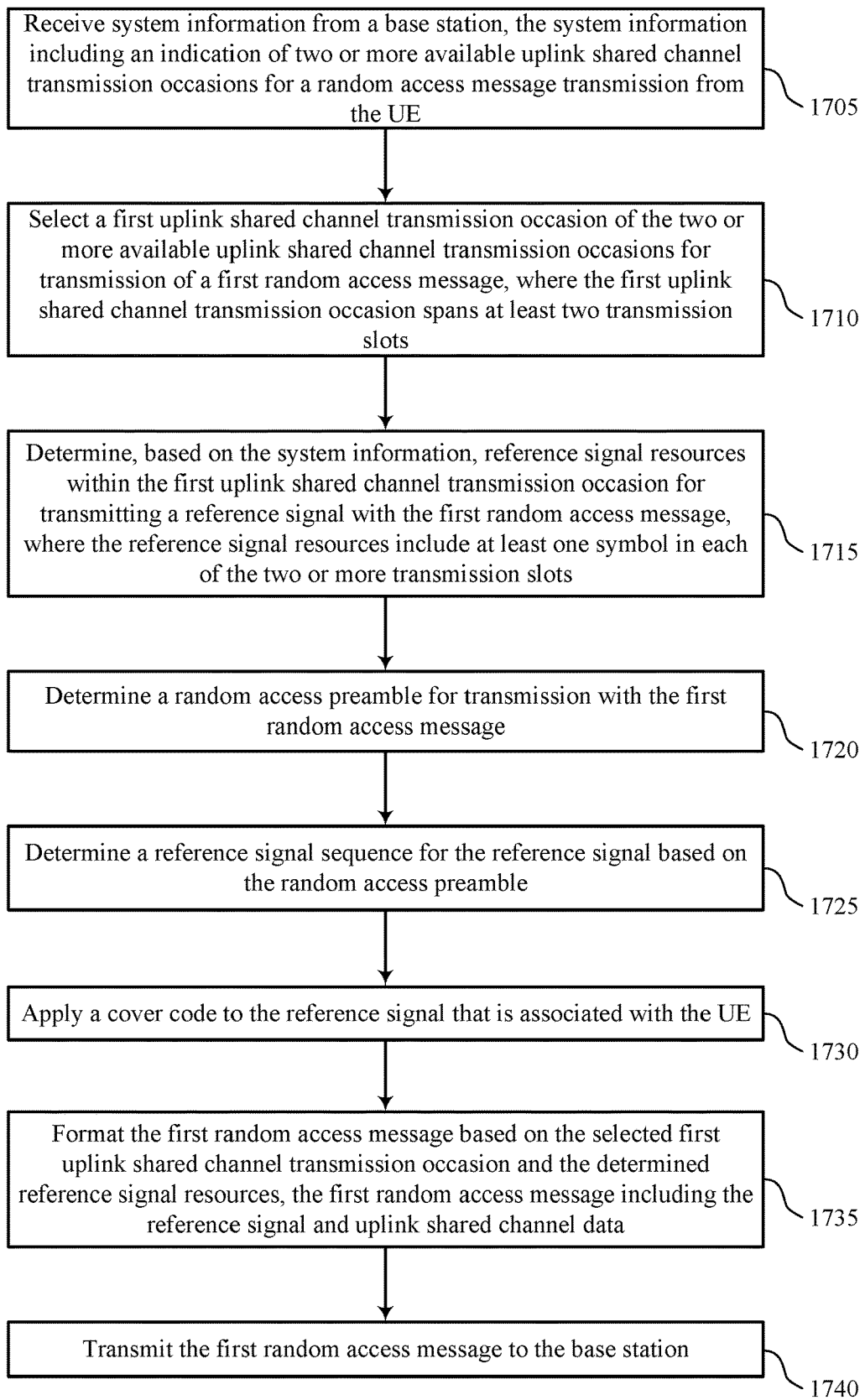

FIG. 17 shows a flowchart illustrating a method 1700 that supports reference signal transmission techniques for random access messages in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive system information from a base station, the system information including an indication of two or more available uplink shared channel transmission occasions for a random access message transmission from the UE. The operations of 1705 may be performed according to the methods described herein. In some examples, aspects of the operations of 1705 may be performed by a system information manager as described with reference to FIGS. 8 through 11.

At 1710, the UE may select a first uplink shared channel transmission occasion of the two or more available uplink shared channel transmission occasions for transmission of a first random access message, where the first uplink shared channel transmission occasion spans at least two transmission slots. The operations of 1710 may be performed according to the methods described herein. In some examples, aspects of the operations of 1710 may be performed by a PO manager as described with reference to FIGS. 8 through 11.

At 1715, the UE may determine, based on the system information, reference signal resources within the first uplink shared channel transmission occasion for transmitting a reference signal with the first random access message, where the reference signal resources include at least one symbol in each of the two or more transmission slots. The operations of 1715 may be performed according to the methods described herein. In some examples, aspects of the operations of 1715 may be performed by a reference signal resource manager as described with reference to FIGS. 8 through 11.

At 1720, the UE may determine a random access preamble for transmission with the first random access message. The operations of 1720 may be performed according to the methods described herein. In some examples, aspects of the operations of 1720 may be performed by a random access preamble manager as described with reference to FIGS. 8 through 11.

At 1725, the UE may determine a reference signal sequence for the reference signal based on the random access preamble. The operations of 1725 may be performed according to the methods described herein. In some examples, aspects of the operations of 1725 may be performed by a reference signal sequence manager as described with reference to FIGS. 8 through 11.

At 1730, the UE may apply a cover code to the reference signal that is associated with the UE. The operations of 1730 may be performed according to the methods described herein. In some examples, aspects of the operations of 1730 may be performed by a reference signal sequence manager as described with reference to FIGS. 8 through 11.

At 1735, the UE may format the first random access message based on the selected first uplink shared channel transmission occasion and the determined reference signal resources, the first random access message including the reference signal and uplink shared channel data. The operations of 1735 may be performed according to the methods described herein. In some examples, aspects of the operations of 1735 may be performed by a random access message manager as described with reference to FIGS. 8 through 11.

At 1740, the UE may transmit the first random access message to the base station. The operations of 1740 may be performed according to the methods described herein. In some examples, aspects of the operations of 1740 may be performed by a random access message manager as described with reference to FIGS. 8 through 11.

Figure 18:
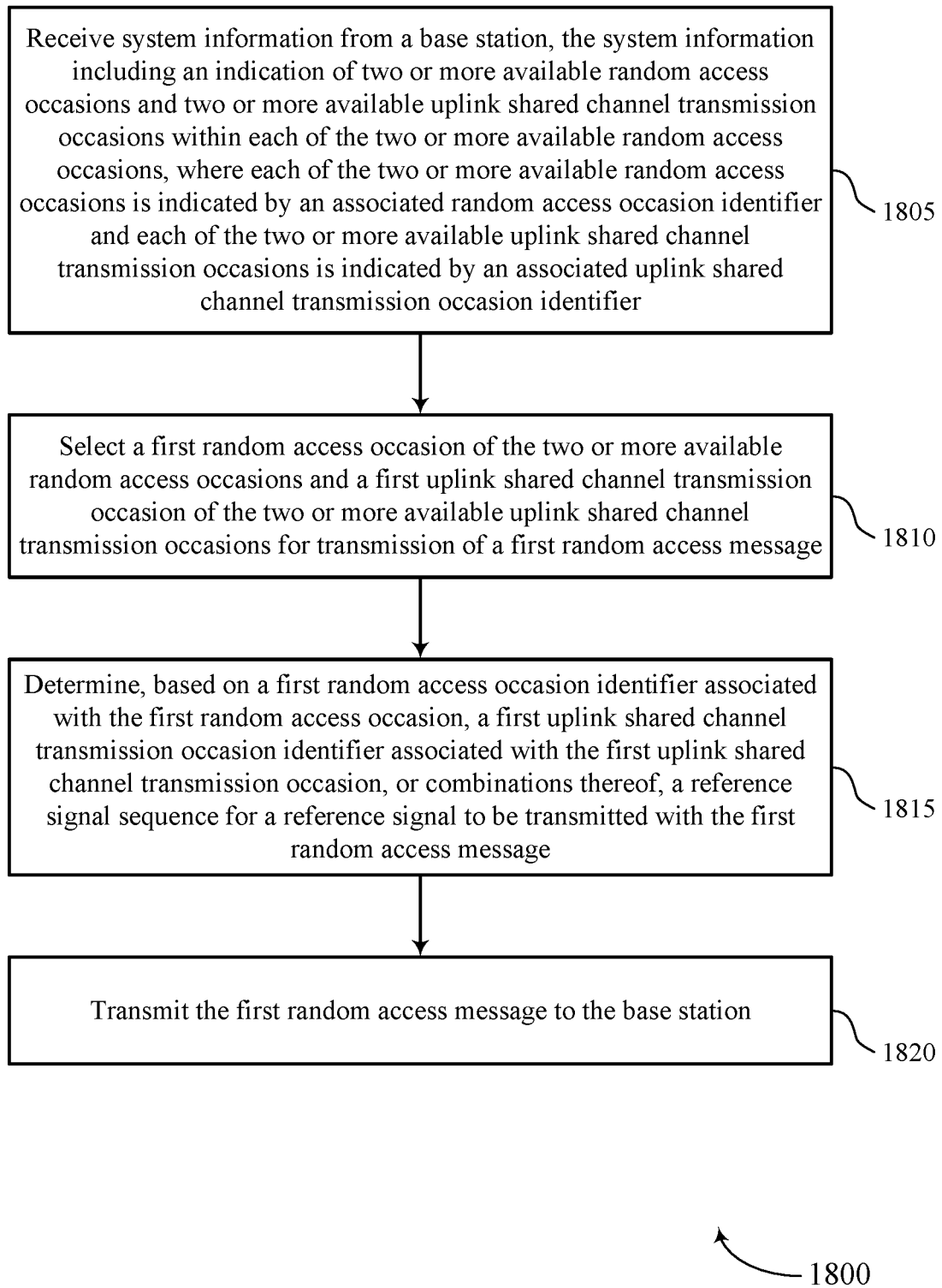

FIG. 18 shows a flowchart illustrating a method 1800 that supports reference signal transmission techniques for random access messages in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive system information from a base station, the system information including an indication of two or more available random access occasions and two or more available uplink shared channel transmission occasions within each of the two or more available random access occasions, where each of the two or more available random access occasions is indicated by an associated random access occasion identifier and each of the two or more available uplink shared channel transmission occasions is indicated by an associated uplink shared channel transmission occasion identifier. The operations of 1805 may be performed according to the methods described herein. In some examples, aspects of the operations of 1805 may be performed by a system information manager as described with reference to FIGS. 8 through 11.

At 1810, the UE may select a first random access occasion of the two or more available random access occasions and a first uplink shared channel transmission occasion of the two or more available uplink shared channel transmission occasions for transmission of a first random access message. The operations of 1810 may be performed according to the methods described herein. In some examples, aspects of the operations of 1810 may be performed by a RO manager as described with reference to FIGS. 8 through 11.

At 1815, the UE may determine, based on a first random access occasion identifier associated with the first random access occasion, a first uplink shared channel transmission occasion identifier associated with the first uplink shared channel transmission occasion, or combinations thereof, a reference signal sequence for a reference signal to be transmitted with the first random access message. The operations of 1815 may be performed according to the methods described herein. In some examples, aspects of the operations of 1815 may be performed by a reference signal sequence manager as described with reference to FIGS. 8 through 11.

At 1820, the UE may transmit the first random access message to the base station. The operations of 1820 may be performed according to the methods described herein. In some examples, aspects of the operations of 1820 may be performed by a random access message manager as described with reference to FIGS. 8 through 11.

Figure 19:
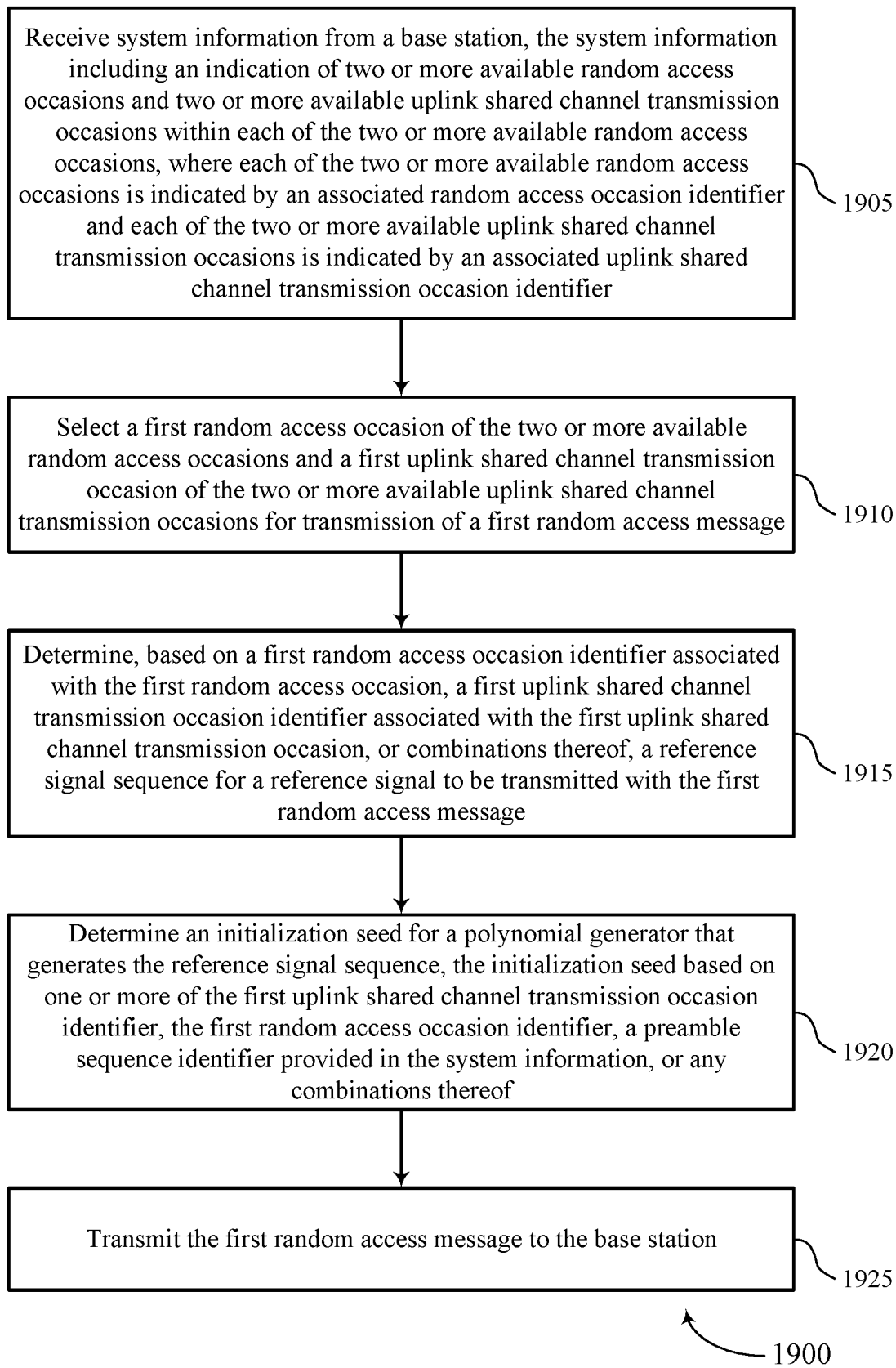

FIG. 19 shows a flowchart illustrating a method 1900 that supports reference signal transmission techniques for random access messages in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive system information from a base station, the system information including an indication of two or more available random access occasions and two or more available uplink shared channel transmission occasions within each of the two or more available random access occasions, where each of the two or more available random access occasions is indicated by an associated random access occasion identifier and each of the two or more available uplink shared channel transmission occasions is indicated by an associated uplink shared channel transmission occasion identifier. The operations of 1905 may be performed according to the methods described herein. In some examples, aspects of the operations of 1905 may be performed by a system information manager as described with reference to FIGS. 8 through 11.

At 1910, the UE may select a first random access occasion of the two or more available random access occasions and a first uplink shared channel transmission occasion of the two or more available uplink shared channel transmission occasions for transmission of a first random access message. The operations of 1910 may be performed according to the methods described herein. In some examples, aspects of the operations of 1910 may be performed by a RO manager as described with reference to FIGS. 8 through 11.

At 1915, the UE may determine, based on a first random access occasion identifier associated with the first random access occasion, a first uplink shared channel transmission occasion identifier associated with the first uplink shared channel transmission occasion, or combinations thereof, a reference signal sequence for a reference signal to be transmitted with the first random access message. The operations of 1915 may be performed according to the methods described herein. In some examples, aspects of the operations of 1915 may be performed by a reference signal sequence manager as described with reference to FIGS. 8 through 11.

At 1920, the UE may determine an initialization seed for a polynomial generator that generates the reference signal sequence, the initialization seed based on one or more of the first uplink shared channel transmission occasion identifier, the first random access occasion identifier, a preamble sequence identifier provided in the system information, or any combinations thereof. The operations of 1920 may be performed according to the methods described herein. In some examples, aspects of the operations of 1920 may be performed by a reference signal sequence manager as described with reference to FIGS. 8 through 11.

At 1925, the UE may transmit the first random access message to the base station. The operations of 1925 may be performed according to the methods described herein. In some examples, aspects of the operations of 1925 may be performed by a random access message manager as described with reference to FIGS. 8 through 11.

Figure 20:
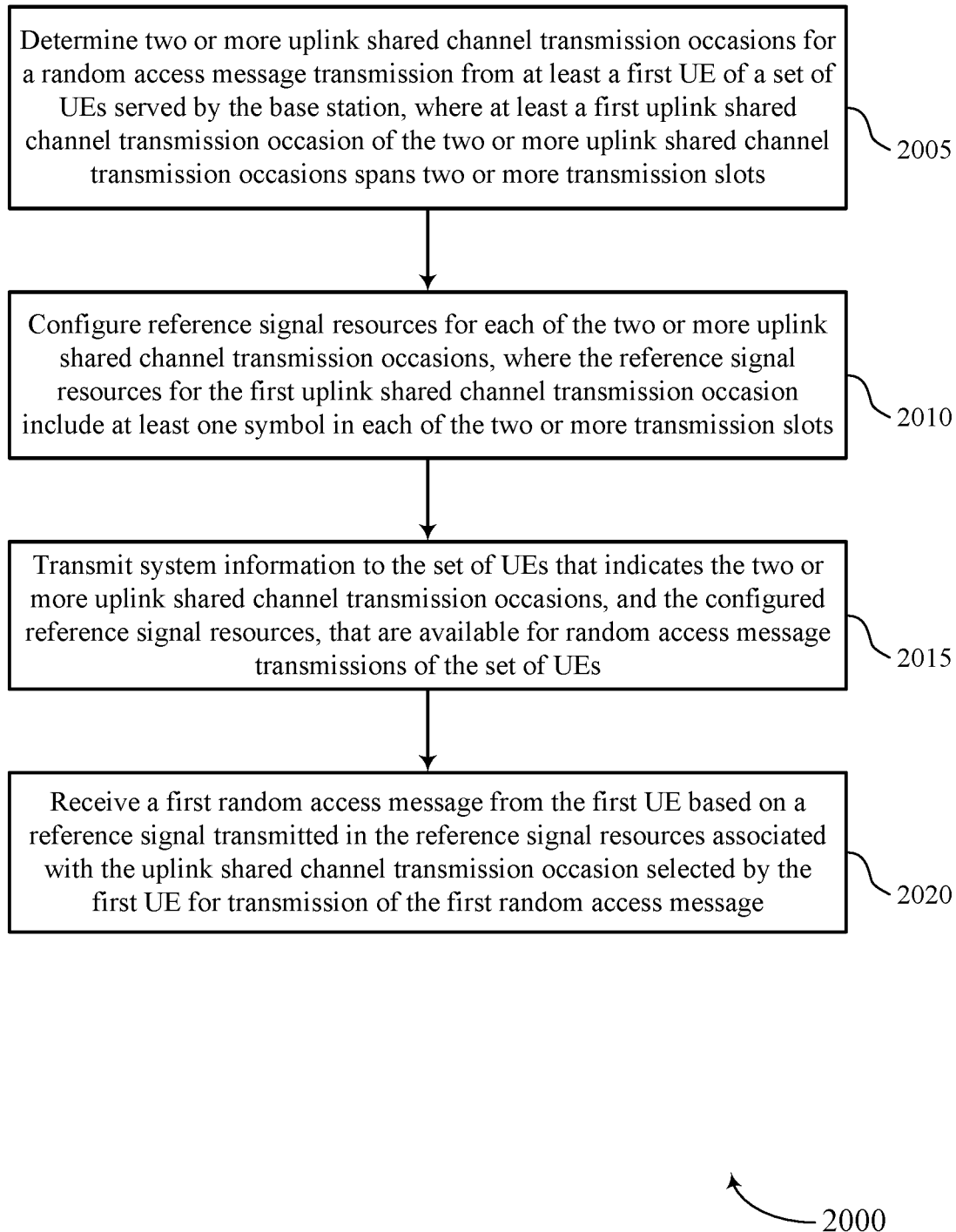

FIG. 20 shows a flowchart illustrating a method 2000 that supports reference signal transmission techniques for random access messages in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may determine two or more uplink shared channel transmission occasions for a random access message transmission from at least a first UE of a set of UEs served by the base station, where at least a first uplink shared channel transmission occasion of the two or more uplink shared channel transmission occasions spans two or more transmission slots. The operations of 2005 may be performed according to the methods described herein. In some examples, aspects of the operations of 2005 may be performed by a PO manager as described with reference to FIGS. 12 through 15.

At 2010, the base station may configure reference signal resources for each of the two or more uplink shared channel transmission occasions, where the reference signal resources for the first uplink shared channel transmission occasion include at least one symbol in each of the two or more transmission slots. The operations of 2010 may be performed according to the methods described herein. In some examples, aspects of the operations of 2010 may be performed by a reference signal resource manager as described with reference to FIGS. 12 through 15.

At 2015, the base station may transmit system information to the set of UEs that indicates the two or more uplink shared channel transmission occasions, and the configured reference signal resources, that are available for random access message transmissions of the set of UEs. The operations of 2015 may be performed according to the methods described herein. In some examples, aspects of the operations of 2015 may be performed by a system information manager as described with reference to FIGS. 12 through 15.

At 2020, the base station may receive a first random access message from the first UE based on a reference signal transmitted in the reference signal resources associated with the uplink shared channel transmission occasion selected by the first UE for transmission of the first random access message. The operations of 2020 may be performed according to the methods described herein. In some examples, aspects of the operations of 2020 may be performed by a random access message manager as described with reference to FIGS. 12 through 15.

Figure 21:
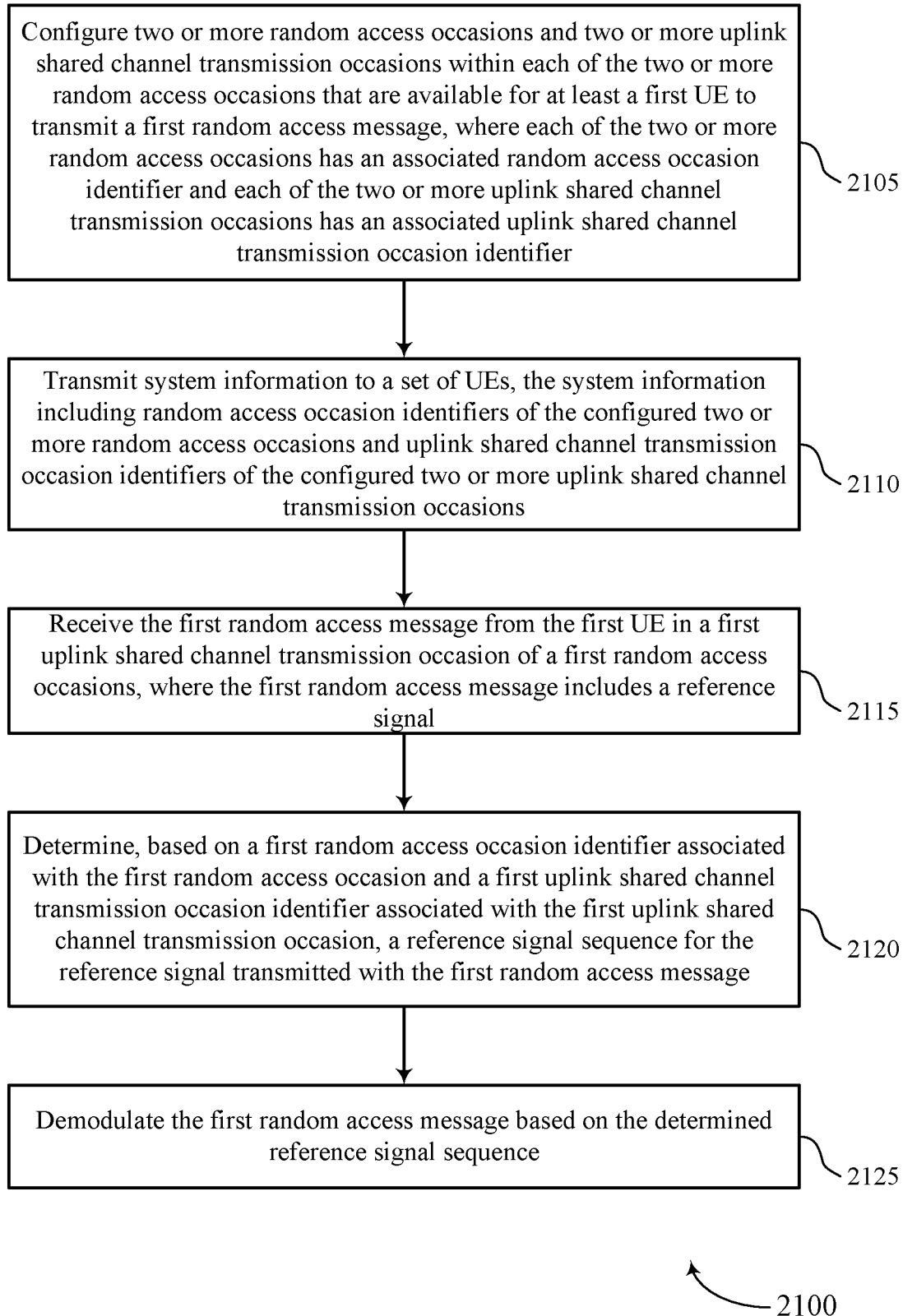

FIG. 21 shows a flowchart illustrating a method 2100 that supports reference signal transmission techniques for random access messages in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may configure two or more random access occasions and two or more uplink shared channel transmission occasions within each of the two or more random access occasions that are available for at least a first UE to transmit a first random access message, where each of the two or more random access occasions has an associated random access occasion identifier and each of the two or more uplink shared channel transmission occasions has an associated uplink shared channel transmission occasion identifier. The operations of 2105 may be performed according to the methods described herein. In some examples, aspects of the operations of 2105 may be performed by a RO manager as described with reference to FIGS. 12 through 15.

At 2110, the base station may transmit system information to a set of UEs, the system information including random access occasion identifiers of the configured two or more random access occasions and uplink shared channel transmission occasion identifiers of the configured two or more uplink shared channel transmission occasions. The operations of 2110 may be performed according to the methods described herein. In some examples, aspects of the operations of 2110 may be performed by a reference signal resource manager as described with reference to FIGS. 12 through 15.

At 2115, the base station may receive the first random access message from the first UE in a first uplink shared channel transmission occasion of a first random access occasions, where the first random access message includes a reference signal. The operations of 2115 may be performed according to the methods described herein. In some examples, aspects of the operations of 2115 may be performed by a random access message manager as described with reference to FIGS. 12 through 15.

At 2120, the base station may determine, based on a first random access occasion identifier associated with the first random access occasion and a first uplink shared channel transmission occasion identifier associated with the first uplink shared channel transmission occasion, a reference signal sequence for the reference signal transmitted with the first random access message. The operations of 2120 may be performed according to the methods described herein. In some examples, aspects of the operations of 2120 may be performed by a reference signal sequence manager as described with reference to FIGS. 12 through 15.

At 2125, the base station may demodulate the first random access message based on the determined reference signal sequence. The operations of 2125 may be performed according to the methods described herein. In some examples, aspects of the operations of 2125 may be performed by a random access message manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving radio resource control (RRC) signaling, the RRC signaling including an indication of two or more available uplink channel transmission occasions for random access message transmission, wherein the two or more available uplink channel transmission occasions span at least two slots;

selecting at least one uplink channel transmission occasion of the two or more available uplink channel transmission occasions for transmission of a random access message;

formatting the random access message, based at least in part on the RRC signaling and the selected at least one uplink channel transmission occasion, to include a preamble, a reference signal, and a physical uplink shared channel (PUSCH), wherein reference signal resources for the reference signal include at least one symbol in a of the PUSCH; and transmitting the random access message using the selected at least one uplink channel transmission occasion.

2. The method of claim 1, further comprising:

determining a random access preamble for transmission with the random access message; and determining a reference signal sequence and a time-frequency resource mapping for the reference signal based at least in part on the random access preamble selected for the random access message and a waveform configuration for the PUSCH.

3. The method of claim 1, wherein:
the reference signal is a demodulation reference signal; and
the reference signal resources are distributed in each slot of the PUSCH carrying uplink data of the random access message.

4. The method of claim 1, further comprising:
extending a number of symbols used by the reference signal based at least in part on the RRC signaling; and
applying a cover code to at least two symbols of the reference signal.

5. The method of claim 4, further comprising:
determining the cover code based at least in part on a codebook indicated by the RRC signaling, and wherein the cover code spans at least one reference signal resource in each slot of the PUSCH and the codebook comprises binary or non-binary quasi-orthogonal sequences.

6. The method of claim 4, further comprising:
determining a first cover code associated with a first slot of the PUSCH based at least in part on a first codebook associated with the first slot; and
determining a second cover code associated with a second slot of the PUSCH based at least in part on a second codebook associated with the second slot being different from the first codebook.

7. The method of claim 6, wherein the first codebook is associated with a first subset of PUSCH transmission occasions associated with the two or more available uplink channel transmission occasions and the second codebook is associated with a second subset of PUSCH transmission occasions associated with the two or more available uplink channel transmission occasions different from the first subset.

8. The method of claim 4, wherein the cover code is applied separately or jointly across frequency domain and time domain resources at least two PUSCH transmission occasions associated with the selected at least one uplink channel transmission occasion.

9. The method of claim 1, wherein the UE is in an RRC connected state.

10. The method of claim 1, wherein the RRC signaling comprises system information of an RRC message.

11. The method of claim 1, wherein the random access message comprises a msgA of a two-step random access channel (RACH) procedure.

12. The method of claim 1, wherein each of the at least two slots comprises at least one of the preamble, the reference signal, or a payload of the random access message.

13. An apparatus for wireless communication at a user equipment (UE), comprising:
a processor;
memory coupled with the processor; and
instructions stored in the memory and executable by the processor to cause the apparatus to:
receive radio resource control (RRC) signaling, the RRC signaling including an indication of two or more available uplink channel transmission occasions for random access message transmission, wherein the two or more available uplink channel transmission occasions span at least two slots;
select at least one uplink channel transmission occasion of the two or more available uplink channel transmission occasions for transmission of a random access message;
format the random access message, based at least in part on the RRC signaling and the selected at least one uplink channel transmission occasion, to include a preamble, a reference signal, and a physical uplink shared channel (PUSCH), wherein reference signal resources for the reference signal include at least one symbol in a slot of the PUSCH; and
transmit the random access message using the selected at least one uplink channel transmission occasion.

14. The apparatus of claim 13, wherein the instructions are further executable by the processor to cause the apparatus to:
determine a random access preamble for transmission with the random access message; and
determine a reference signal sequence and a time-frequency resource mapping for the reference signal based at least in part on the random access preamble selected for the random access message and a waveform configuration for the PUSCH.

15. The apparatus of claim 13, wherein:
the reference signal is a demodulation reference signal; and
the reference signal resources are distributed in each slot of the PUSCH carrying uplink data of the random access message.

16. The apparatus of claim 13, wherein the instructions are further executable by the processor to cause the apparatus to:
extend a number of symbols used by the reference signal based at least in part on the RRC signaling; and
apply a cover code to at least two symbols of the reference signal.

17. The apparatus of claim 16, wherein the instructions are further executable by the processor to cause the apparatus to:
determine the cover code based at least in part on a codebook indicated by the RRC signaling, and wherein the cover code spans at least one reference signal resource in each slot of the PUSCH and the codebook comprises binary or non-binary quasi-orthogonal sequences.

18. The apparatus of claim 16, wherein the instructions are further executable by the processor to cause the apparatus to:
determine a first cover code associated with a first slot of the PUSCH based at least in part on a first codebook associated with the first slot; and
determine a second cover code associated with a second slot of the PUSCH based at least in part on a second codebook associated with the second slot being different from the first codebook.

19. The apparatus of claim 18, wherein the first codebook is associated with a first subset of PUSCH transmission occasions associated with the two or more available uplink channel transmission occasions and the second codebook is associated with a second subset of PUSCH transmission occasions associated with the two or more available uplink channel transmission occasions different from the first subset.

20. The apparatus of claim 16, wherein the cover code is applied separately or jointly across frequency domain and time domain resources at least two PUSCH transmission occasions associated with the selected at least one uplink channel transmission occasion.

21. The apparatus of claim 13, wherein the UE is in an RRC connected state.

22. The apparatus of claim 13, wherein the RRC signaling comprises system information of an RRC message.

23. The apparatus of claim 13, wherein the random access message comprises a msgA of a two-step random access channel (RACH) procedure.

24. The apparatus of claim 13, wherein each of the at least two slots comprises at least one of the preamble, the reference signal, or a payload of the random access message.

25. An apparatus for wireless communication at a user equipment (UE), comprising:
- means for receiving radio resource control (RRC) signaling, the RRC signaling including an indication of two or more available uplink channel transmission occasions for random access message transmission, wherein the two or more available uplink channel transmission occasions span at least two slots;
- means for selecting at least one uplink channel transmission occasion of the two or more available uplink channel transmission occasions for transmission of a random access message;
- means for formatting the random access message, based at least in part on the RRC signaling and the selected at least one uplink channel transmission occasion, to include a preamble, a reference signal, and a physical uplink shared channel (PUSCH), wherein reference signal resources for the reference signal include at least one symbol in a slot of the PUSCH; and
- means for transmitting the random access message using the selected at least one uplink channel transmission occasion.

26. The apparatus of claim 25, further comprising:
- means for determining a random access preamble for transmission with the random access message; and
- means for determining a reference signal sequence and a time-frequency resource mapping for the reference signal based at least in part on the random access preamble selected for the random access message and a waveform configuration for the PUSCH.

27. The apparatus of claim 25, wherein:
the reference signal is a demodulation reference signal; and
the reference signal resources are distributed in each slot of the PUSCH carrying uplink data of the random access message.

28. A non-transitory computer-readable medium storing code for wireless communication at a user equipment (UE), the code comprising instructions executable by a processor to:
- receive radio resource control (RRC) signaling, the RRC signaling including an indication of two or more available uplink channel transmission occasions for random access message transmission, wherein the two or more available uplink channel transmission occasions span at least two slots;
- select at least one uplink channel transmission occasion of the two or more available uplink channel transmission occasions for transmission of a random access message;
- format the random access message, based at least in part on the RRC signaling and the selected at least one uplink channel transmission occasion, to include a preamble, a reference signal, and a physical uplink shared channel (PUSCH), wherein reference signal resources for the reference signal include at least one symbol in a slot of the PUSCH; and
- transmit the random access message using the selected at least one uplink channel transmission occasion.

29. The non-transitory computer-readable medium of claim 28, wherein the instructions are further executable by the processor to:
- determine a random access preamble for transmission with the random access message; and
- determine a reference signal sequence and a time-frequency resource mapping for the reference signal based at least in part on the random access preamble selected for the random access message and a waveform configuration for the PUSCH.

30. The non-transitory computer-readable medium of claim 28, wherein:
the reference signal is a demodulation reference signal; and
the reference signal resources are distributed in each slot of the PUSCH carrying uplink data of the random access message.

\* \* \* \* \*